(12) United States Patent
Lee

(10) Patent No.: US 10,747,335 B2
(45) Date of Patent: Aug. 18, 2020

(54) CHARACTER AND FUNCTION RECOGNITION APPARATUS AND METHOD FOR DUAL FUNCTION OF INPUT AND OUTPUT IN CHARACTER OUTPUT AREA

(71) Applicant: Jin Woo Lee, Seoul (KR)

(72) Inventor: Jin Woo Lee, Seoul (KR)

( * ) Notice: Subject to any disclaimer, the term of this patent is extended or adjusted under 35 U.S.C. 154(b) by 72 days.

(21) Appl. No.: 15/684,990

(22) Filed: Aug. 24, 2017

(65) Prior Publication Data

US 2018/0059802 A1 Mar. 1, 2018

(30) Foreign Application Priority Data

Aug. 26, 2016 (KR) .......................... 10-2016-0109032

(51) Int. Cl.
*G06F 3/023* (2006.01)
*G06F 3/01* (2006.01)
*G06F 3/0488* (2013.01)

(52) U.S. Cl.
CPC ............ *G06F 3/0237* (2013.01); *G06F 3/018* (2013.01); *G06F 3/04883* (2013.01); *G06F 3/04886* (2013.01)

(58) Field of Classification Search
CPC .... G06F 3/0237; G06F 3/018; G06F 3/04883; G06F 3/04886
USPC ........................................................ 345/168
See application file for complete search history.

(56) References Cited

U.S. PATENT DOCUMENTS

| 6,466,237 B1* | 10/2002 | Miyao | G06F 3/0483 |
| | | | 715/838 |
| 7,860,536 B2* | 12/2010 | Jobs | G06F 3/0236 |
| | | | 340/815.86 |
| 2004/0100479 A1* | 5/2004 | Nakano | G06F 3/0362 |
| | | | 715/700 |
| 2007/0046641 A1* | 3/2007 | Lim | G06F 3/0237 |
| | | | 345/173 |
| 2007/0220443 A1* | 9/2007 | Cranfill | G06F 3/0485 |
| | | | 715/786 |

(Continued)

FOREIGN PATENT DOCUMENTS

| KR | 20-2012-0003327 U | 5/2012 |
| KR | 10-1195625 B1 | 10/2012 |

(Continued)

*Primary Examiner* — Carolyn R Edwards
(74) *Attorney, Agent, or Firm* — Bacon & Thomas, PLLC

(57) ABSTRACT

A character recognition apparatus includes a character display region including a plurality of character buttons, a character output region for displaying characters inputted by using the respective character buttons. The character recognition apparatus further includes a character recognition block for recognizing, when a character button is touched and dragged off to the character output region, a non-display matching character matched with the corresponding character button as an input and displaying the non-display matching character in the character output region. The character display region further includes one or more function key buttons, each being matched with a non-display matching function key, and the character recognition block recognizes, when a function key button is touched and dragged off to the character output region, a non-display matching function key matched with the corresponding function key button as an input.

15 Claims, 16 Drawing Sheets

(56) References Cited

U.S. PATENT DOCUMENTS

| | | | | |
|---|---|---|---|---|
| 2009/0066656 A1* | 3/2009 | Jung | ............... | G06F 3/0236 |
| | | | | 345/171 |
| 2010/0245252 A1* | 9/2010 | Ghassabian | ......... | G06F 3/04886 |
| | | | | 345/169 |
| 2011/0115722 A1* | 5/2011 | Mok | ............... | G06F 3/0236 |
| | | | | 345/173 |
| 2011/0302518 A1* | 12/2011 | Zhang | ............... | G06F 3/0234 |
| | | | | 715/773 |
| 2014/0009427 A1* | 1/2014 | Kang | ............... | G06F 3/04883 |
| | | | | 345/173 |
| 2016/0124633 A1* | 5/2016 | Kim | ............... | G06F 1/1643 |
| | | | | 715/773 |
| 2016/0328141 A1* | 11/2016 | Fan | ............... | G06F 3/04886 |
| 2017/0003873 A1* | 1/2017 | Park | ............... | G06F 3/0236 |

FOREIGN PATENT DOCUMENTS

| | | | |
|---|---|---|---|
| KR | 10-2015-0062104 A | 6/2015 | |
| KR | 10-1568716 B1 | 11/2015 | |

\* cited by examiner

CHARACTER AND FUNCTION RECOGNITION APPARATUS AND METHOD FOR DUAL FUNCTION OF INPUT AND OUTPUT IN CHARACTER OUTPUT AREA

CROSS-REFERENCE TO RELATED APPLICATIONS

This application is based on and claims priority to Korean Patent Application No. 10-2016-0109032, filed on Aug. 26, 2016, the disclosure of which is incorporated herein in its entirety by reference.

FIELD OF THE INVENTION

The present invention relates to a character recognition technique; and, more particularly, to a character and function recognition apparatus and a character and function recognition method which allow characters to be accurately and quickly inputted in a small-sized wearable device such as a smart watch having a subminiature input keypad that is relatively small or the like.

BACKGROUND OF THE INVENTION

As well known, most of portable information devices such as portable terminals (mobile phone, smart phone, smart device, navigation, watch phone, wearable device and the like) and the like generally have a touch type small-sized keypad (touch panel). Although the small-sized keypad has been conventionally used for short message service (SMS), it is recently widely used for memo, various data processing using the portable information devices, and the like.

Recently, the small-sized terminal such as a wearable device, e.g., a smart watch or the like, is spreading rapidly. In general, the small-sized terminal has a subminiature touch panel that is relatively smaller than that of a portable terminal due to the size of the entire product.

In that case, the subminiature touch panel attached to the small-sized terminal provides a relatively small input space, which makes it difficult to input characters by using a conventional keyboard input technique using a qwerty keyboard or the like.

In addition, in the conventional small-sized terminal, a large number of character buttons need to be arranged in a relatively small input space and, thus, a size of each character button becomes relatively smaller. Accordingly, a typing error is made frequently. When the typing error is made, it is required to delete a mistyped character and input a desired character. As a result, the character input speed becomes considerably slower.

Reference Document: Korean Patent No. 10-1568716

SUMMARY OF THE INVENTION

In view of the above, the present invention suggests a character recognition technique in which a single character button is matched with one or more non-display matching characters and dual functions of character input and output are performed at the same time on a character output region by recognizing as an input the matching character matched with the character of the character button by dragging off the touch of the character button to the character output region serving as a common use region.

The present invention further suggests a character recognition technique capable of minimizing a typing error even in an environment where the small-sized terminal is shaken by recognizing the non-display matching character as an input character by utilizing the character output region that is relatively large compared to the size of the character button.

The present invention further suggests a character recognition technique capable of changing a mistyped character to a next or a previous character in a dictionary order by touching the character output region serving as the common use region without deleting the mistyped character (misinputted character).

The present invention further suggests a character recognition technique capable of changing a mistyped character to an upper or a lower matching character adjacent thereto in an upper or a lower direction of a qwerty keyboard structure by touching an upper or a lower outer side of the character display region without deleting the mistyped character.

The drawbacks of the present invention are not limited to the aforementioned drawbacks, and other drawbacks that have not been mentioned can be clearly understood by those skilled in the art from the following description.

In accordance with a first aspect of the present disclosure, there is provided a character recognition apparatus including: a character display region including a plurality of character buttons; a character output region for displaying characters inputted by using the respective character buttons; and a character recognition block for recognizing, when a character button is touched and dragged off to the character output region, a non-display matching character matched with the corresponding character button as an input and displaying the non-display matching character in the character output region.

The character display region further may include one or more function key buttons, each being matched with a non-display matching function key, and the character recognition block may recognize, when a function key button is touched and dragged off to the character output region, a non-display matching function key matched with the corresponding function key button as an input.

When the character output region is touched off within a predetermined time after the display of the character or the matching character, the character recognition block may sequentially change a character currently displayed on the character output region to a next character in a dictionary order in response to the number of touch off.

When the touch in the character output region is maintained for a predetermined time after the display of the character or the matching character and then released within a predetermined time, the character recognition block may change a character currently displayed on the character output region to a previous character in a dictionary order and then sequentially to previous characters in the dictionary order in response to the number of touch off in the character output region.

The character recognition block may include: a touch detection unit for detecting touch or touch off of the character button and a function key button; a drag detection unit for detecting drag or drag off to the character output region; and a character display unit for recognizing, when the touch off is detected, the character as an input and displaying the character in the character output region and for recognizing, when the drag off is detected, the matching character as an input and displaying the matching character in the character output region.

In accordance with a second aspect of the present disclosure, there is provided a character recognition method including: displaying on a touch panel a character input screen including a character display region having a plurality of character buttons and a character output region for displaying an input character; recognizing, when a character button is touched off, a character of the character button as an input and displaying the character in the character output region; and recognizing, when the touch of the character button is dragged off to the character output region, a non-display matching character matched with the character as an input and displaying the non-display matching character in the character output region.

The character recognition method may further include: sequentially changing, when the character output region is touched off within a predetermined time after the display of the character or the matching character, a character currently displayed on the character output region to next characters in the dictionary order in response to the number of touch off.

The character recognition method may further include: changing, when the touch in the character output region is maintained for a predetermined time after the display of the character or the matching character and then released within a predetermined time, a character currently displayed on the character output region to a previous character in the dictionary order and sequentially changing the character currently displayed on the character output region to previous characters in the dictionary order in response to the number of touch off in the character output region.

In accordance with a third aspect of the present disclosure, there is provided a computer-readable storage medium storing a computer program for allowing a processor to perform the character recognition method described above. In accordance with a second aspect of the present disclosure, there is provided In accordance with a fourth aspect of the present disclosure, there is provided a computer program stored in a computer-readable storage medium to allow a processor to perform the character recognition method described above.

In accordance with a fifth aspect of the present disclosure, there is provided a character recognition apparatus including: a character display region having keyboard buttons in the middle row of a qwerty keyboard; a character output region for outputting characters inputted by using the keyboard buttons; and a character recognition block for recognizing, when touch of a keyboard button is dragged off to the character output region in an upper outer side of the character display region, a non-display upper matching character matched as an upper pair with a character of the keyboard button as an input and displaying the non-display upper matching character in the character output region and for recognizing, when the touch of the keyboard button is dragged off to a lower outer side of the character display region, a non-display lower matching character matched as a lower pair with the character as an input and displaying the non-display lower matching character in the character output region.

The character display region may further include one or more function key buttons, each being matched with a non-display matching function key, and the character recognition block may recognize, when touch of a function key button is dragged off to the character output region, a non-display matching function key matched with the function key button as an input.

The character display region may be disposed at a predetermined position of a lower end portion of a character input screen including the character output region.

The keyboard buttons in the middle row of the qwerty keyboard may be divided into left hand input buttons and right hand input buttons arranged in two layers in a lower end portion of the character input screen including the character output region.

The character display region may be divided into a left hand input keyboard region and a right hand input keyboard region, wherein the left hand input keyboard region may be disposed at a predetermined position of an upper end portion of the character input screen including the character output region, and the right hand input keyboard region may be disposed at a predetermined position of a lower end portion of the character input screen.

When the touch off is detected in the character output region in an upper outer side of the character display region within a predetermined time after the touch off of the keyboard button, the character recognition block may change the character displayed on the character output region to the upper matching character and then sequentially to a character adjacent thereto in an upper right direction in the arrangement of the qwerty keyboard and then display a a matching character matched therewith whenever the touch is made, and, when the touch is maintained for a predetermined time and then released, the character recognition block may change the character displayed on the character output region to a character matched as an upper pair with a previous character of the corresponding character and then sequentially to a character matched as the upper pair therewith and a character adjacent thereto in an upper left direction in the arrangement of the qwerty keyboard whenever the touch is made.

When the touch off is detected in a lower outer side of the character display region within a predetermined time after the touch off of the keyboard button, the character recognition block may change the character displayed on the character output region to the lower matching character and then sequentially to a character adjacent thereto in a lower right direction of the keyboard and a matching character matched therewith whenever the touch is made, and, when the touch is maintained for a predetermined time and then released, the character recognition block may change the character displayed on the character output region to a character matched as the lower pair with a previous character of the corresponding character and then sequentially to a character matched as the lower pair therewith and a character adjacent thereto in a lower left direction of the keyboard and a matching character thereof whenever the touch is made.

The character recognition block may include: a touch detection unit for detecting touch or touch off of a keyboard button; a drag detection unit for detecting drag or drag off to the character output region in an upper outer side of the character display region or to a lower outer side of the character display region; and a character display unit for recognizing, when the touch off is detected, a character displayed on a corresponding keyboard button as an input and displaying the character in the character output region and for recognizing, when the drag off is detected, the upper matching character or the lower matching character as an input and displaying the upper matching character or the lower matching character in the character output region.

In accordance with a sixth aspect of the present disclosure, there is provided a character recognition method including: displaying on a touch panel a character input screen including a character display region having keyboard buttons in the middle of a qwerty keyboard; recognizing, when a keyboard button is touched off, a character displayed on the keyboard button as an input and displaying the character in a character output region; recognizing, when touch of the keyboard button is dragged off to the character output region in an upper outer side of the character display region, a non-display upper matching character matched as an upper pair with the character as an input and displaying the non-display upper matching character in the character output region; and, recognizing, when the touch of the keyboard button is dragged off to a lower outer side of the character display region, a non-display lower matching character matched as a lower pair with the character as an input and displaying the non-display matching character in the character output region.

The character recognition method may further include: changing, when the touch off is detected in the character output region in an upper outer side of the character display region within a predetermined time after the touch off of the keyboard button, the character displayed on the character output region to the upper matching character and then sequentially to a character adjacent thereto in an upper right direction in the arrangement of the qwerty keyboard and then display a a matching character matched therewith whenever the touch is made; and, changing, when the touch is maintained for a predetermined time and then released, the character displayed on the character output region to a character matched as an upper pair with a previous character of the corresponding character and then sequentially to a character matched as the upper pair therewith and a character adjacent thereto in an upper left direction in the arrangement of the qwerty keyboard whenever the touch is made.

The character recognition method may further include: changing, when the touch off is detected in a lower outer side of the character display region within a predetermined time after the touch off of the keyboard button, the character displayed on the character output region to the lower matching character and then sequentially to a character adjacent thereto in a lower right direction of the keyboard and a matching character matched therewith whenever the touch is made; and changing, when the touch is maintained for a predetermined time and then released, the character displayed on the character output region to a character matched as the lower pair with a previous character of the corresponding character and then sequentially to a character matched as the lower pair therewith and a character adjacent thereto in a lower left direction of the keyboard and a matching character thereof whenever the touch is made.

In accordance with a seventh aspect of the present disclosure, there is provided a computer-readable storage medium storing a computer program for allowing a processor to perform the character recognition method described in sixth aspect of the present disclosure.

In accordance with an eighth aspect of the present disclosure, there is provided a computer program stored in a computer-readable storage medium to allow a processor to perform the character recognition method described in sixth aspect of the present disclosure.

In accordance with a ninth aspect of the present disclosure, there is provided a character recognition apparatus including: a character display region having a plurality of character buttons of which characters are matched with non-display matching characters in preset multiple directions; a character output region for outputting characters inputted by using the character buttons; and a character recognition block for recognizing, when touch of a character button is dragged off in one of the directions, a matching character matched in said one of the directions as an input and displaying the matching character in the character output region.

The character display region may further include one or more function key buttons, each being matched with a non-display matching function key, and the character recognition block may recognize, when touch of a function key button is dragged off in one of the directions, a non-display matching function key matched with the function key button as an input.

The character recognition block may recognize, when the touch of the character button is maintained for a predetermined time and then released, a matching character matched in a forward direction with the character of the character button as an input and displays the matching character in the character output region.

The matching characters may be characters next to the character in the dictionary order.

The character display region may be disposed at a predetermined position of a lower end portion of the character input screen including the character output region.

The character display region may be divided into a first input region and a second input region, wherein the first input region may be disposed at a predetermined position in an upper end portion of the character input screen including the character output region, and wherein the second input region may be disposed at a predetermined position in a lower end portion of the character input screen.

When the character output region is touched off within a predetermined time after the display of the character or the matching character, the character recognition block may sequentially change a character currently displayed on the character output region to a next character in the dictionary order in response to the number of touch off.

When the touch is maintained in the character output region for a preset time after the display of the character or the matching character and then released within a predetermined time, the character recognition block may change the character currently displayed on the character output region to a previous character in the dictionary order, and the character recognition block may sequentially change the character currently displayed on the character output region to previous characters in the dictionary order in response to the number of touch off in the character output region.

The character recognition block may include: a touch detection unit for detecting touch or touch off of the character; a drag detection unit for detecting drag or drag off in one of the directions; and a character display unit for recognizing, when the touch off is detected, a character displayed on the character button as an input and displaying the character in the character output region and for recognizing, when the drag off is detected, a matching character matched in a dragged direction as an input and displaying the matching character in the character output region.

In accordance with a tenth aspect of the present disclosure, there is provided a character recognition method including: displaying on a touch panel a character display region including a character display region having a plurality of character buttons of which characters are matched with non-display matching character in preset multiple directions; recognizing, when a character button is touched off, a character of the character button as an input and displaying the character in the character output region; and recognizing, when the touch of the character button is dragged off in one of the directions, a matching character matched in said one of the directions as an input and displaying the matching character in the character output region.

The character recognition method may further include: recognizing, when the touch of the character button is maintained for a predetermined time and then released, a matching character matched in a forward direction with the character of the character button as an input and displaying the matching character in the character output region.

In accordance with an eleventh aspect of the present disclosure, there is provided a computer-readable storage medium storing a computer program for allowing a processor to perform the character recognition method described in the tenth aspect of the present disclosure.

In accordance with a twelfth aspect of the present disclosure, there is provided A computer program stored in a computer-readable storage medium to allow a processor to perform the character recognition method described in the tenth aspect of the present disclosure.

EFFECTS OF THE INVENTION

In the present invention, by dragging off the touch of the character button to the character output region serving as the common use region, one or more matching characters matched with the character button can be recognized as an input. Accordingly, accurate and quick character input can be realized in a subminiature touch panel attached to a small-sized terminal and, also, an input error can be minimized (reduced).

Further, in the present invention, the non-display matching character is inputted by utilizing the common use region that is relatively large compared to the size of the character button. Therefore, mistyping that may be caused by shaking of the small-sized terminal or the like can be minimized.

Moreover, in the present invention, the mistyped character is changed to a character adjacent thereto by touching the character output region as the common use region without deleting the mistyped character. Accordingly, the decrease in the character input speed which is caused by the mistyping can be minimized (reduced).

BRIEF DESCRIPTION OF THE DRAWINGS

The objects and features of the disclosure will become apparent from the following description of embodiments, given in conjunction with the accompanying drawings, in which.

DETAILED DESCRIPTION OF THE EMBODIMENTS

The advantages and features of embodiments and methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present invention, if it is determined that detailed description of related known components or functions unnecessarily obscures the gist of the present invention, the detailed description thereof will be omitted. Further, the terminologies to be described below are defined in consideration of functions of the embodiments of the present invention and may vary depending on a user's or an operator's intention or practice. Accordingly, the definition thereof may be made on a basis of the content throughout the specification.

Hereinafter, embodiments of the present invention will be described in detail with reference to the accompanying drawings.

First Embodiment

Figure 1A:
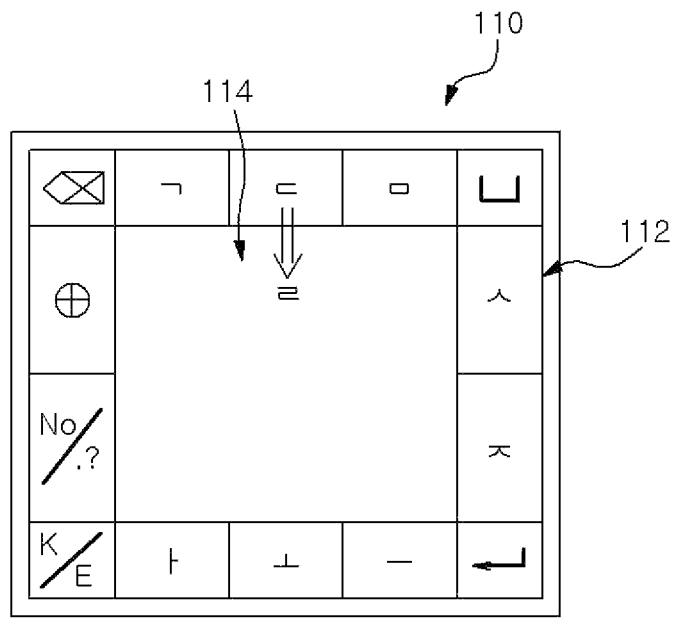
FIGS. 1A and 1B show examples of a screen where a character recognition method according to a first embodiment of the present disclosure is performed.
Figure 1B:
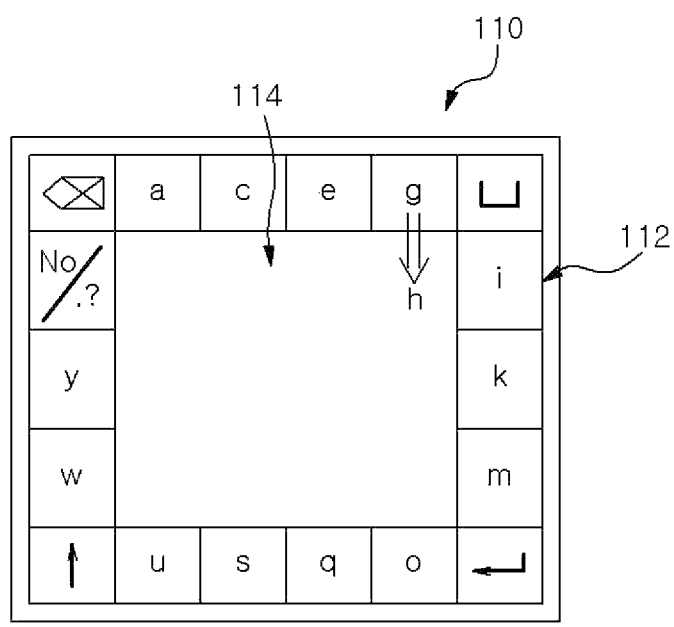

FIGS. 1A and 1B show examples of a screen where a character recognition method according to a first embodiment of the present disclosure is performed.

Referring to FIGS. 1A and 1B, a character input screen 110 displayed on a touch panel (touch-type small-sized display panel) attached (installed) to a small-sized terminal (e.g., a small-sized wearable device such as a smart watch or the like) may include, e.g., a character display region 112, a character output region 114, or the like.

The character display region 112 in the character input screen is provided with a plurality of buttons (e.g., character buttons, function key buttons, symbol buttons and the like) displaying a plurality of characters, function keys, symbols and the like. For example, in a touch panel having a square structure, the buttons may be arranged (formed) around four sides thereof.

Each of the character buttons may be defined as a touch button or a touch key. The character buttons may be consonant buttons or vowel buttons of Korean, alphabet buttons of English, or the like. Each of the character buttons may be assigned with a single character and a matching character matched therewith (i.e., non-display matching character).

The function key buttons may include a space key, a back space key, an enter key, a shift key and the like. Each of the function key buttons may be assigned with a single function key and a matching function key matched therewith (i.e., non-display matching function key).

For example, in a character input screen for inputting Korean which is shown in FIG. 1A, a 'ㄱ' button is assigned with a non-display 'ㄴ' character as a matching character which is a next character in a dictionary order. A 'ㄷ' button is assigned with a non-display 'ㄹ' character as a matching character which is a next character in the dictionary order. In this manner, each of the character buttons (consonant buttons, vowel buttons and the like) may be provided with a single matching character.

For example, in a character input screen for inputting alphabet which is shown in FIG. 1B, an 'a' button is assigned with a non-display 'b' character that is a next character in the dictionary order (or in an alphabetical order). A 'c' button is assigned with a non-display 'd' button that is a next character in the dictionary order. In this manner, each of the character buttons (alphabet buttons) may be provided with a single matching character.

The character output region 114 in the character input screen displays a character inputted by a user's touch off interface or drag off interface (or character recognized as input) or a matching character. Since the touch of the character button in the character display region is dragged off in order to display the matching display, the character output region 114 may be defined as a common use region for recognizing the matching character. The dual functions of character input and output can be performed in the character output region 114.

Referring to FIG. 1A, when the 'ㄷ' button in the character display region 112 is touched off by the user interface, the consonant 'ㄷ' is recognized as an input and displayed on a predetermined position of the character output region 114. When the 'ㄷ' button is touched and dragged off to the character output region 114, a non-display consonant 'ㄹ' that is a matching character matched with the 'ㄷ' character of the 'ㄷ' button is recognized as an input and displayed on a predetermined position of the character output region 114. Here, "non-display" may indicate that the corresponding character (matching character) is not displayed as a character button on the character display region 112.

In other words, in the Korean recognition method of the present embodiment, two different characters (e.g., characters close to each other in the dictionary order) are inputted by using a single character button. Specifically, a character displayed on a character button can be recognized as an input character by touching off the character button of the character display region and a non-display matching character matched (assigned) with the character of the corresponding character button can be recognized as an input character by touching the corresponding character button and dragging it off to the character output region.

In the character recognition method of the present embodiment, the character (or the matching character) that is recognized as an input character by touch off or drag off and currently displayed on the character display region 114 can be changed to and displayed as a next or a previous order in the dictionary order.

For example, when the touch off is detected in the character output region within a predetermined time (e.g., 1 second, 1.5 second, 2 seconds or the like) in a state where the character (or the matching character) recognized as the input character by the touch off or the drag off is displayed on the character output region 114, the character (e.g., 'ㄷ') currently displayed on the character output region 114 can be changed to and displayed as a next character (e.g., 'ㄹ') in the dictionary order.

Whenever the touch off is detected within the predetermined time (e.g. 1 second, 1.5 seconds, 2 seconds or the like) after the touch is maintained in the character output region for a predetermined time (e.g., 1.5 seconds, 2 seconds, 2.5 seconds, 3 seconds or the like) in a state where the next character is displayed, the character (e.g., 'ㅁ') currently displayed on the character output region 114 can be sequentially changed to and displayed as next characters (e.g., 'ㅁ', 'ㅂ' and the like) in the dictionary order.

When the touch off is detected within the predetermined time (e.g. 1 second, 1.5 seconds, 2 seconds or the like) after the touch is maintained in the character output region 114 for the predetermined time (e.g., 1.5 seconds, 2 seconds, 2.5 seconds, 3 seconds or the like) in a state where the character (or matching character) recognized as the input character by touch off or drag off is displayed on the character output region 114, the character (e.g., 'ㄹ') currently displayed on the character output region 114 can be changed to and displayed as a previous character (e.g., 'ㄷ') in the dictionary order.

Whenever the touch off is detected in the character output region within the predetermined time (e.g., 1 second, 1.5 seconds, 2 seconds or the like) in a state where the previous character is displayed, the character (e.g., 'ㄷ') currently displayed on the character output region 114 can be sequentially changed to and displayed as previous characters (e.g., 'ㄴ', 'ㄱ' or the like) in the dictionary order.

In other words, in the present embodiment, when a user mistypes a character close to a desired character in the dictionary order, the mistyped character can be easily changed to and displayed as (changed to and inputted as) a next or a previous character in the dictionary order only by the user interface (e.g., by touching off the character output region or by touching the character output region for a relatively long period of time and releasing the touch) without deleting the mistyped character and inputting a desired character by the user interface as in the conventional case.

An aspirated consonant, e.g., a 'ㅋ' character, can be inputted (recognized as an aspirated consonant and conversion displayed) by a user interface in which a 'ㄱ' button on the character display region 112 is touched off and, then, a preset function button (e.g., (+) button or the like) is touched off. A hard consonant, e.g., a 'ㄲ' character, can be inputted (recognized as a hard consonant and conversion displayed) by a user interface in which a 'ㄱ' button on the character display region 112 is touched off and then a preset function button (e.g., (+) button or the like) is touched and dragged off to the character output region 114 as a common use region. Further, a hard consonant, e.g., a 'ㄲ' character, can be inputted by a user interface in which a 'ㅋ' character is inputted (conversion displayed) and then the character output region 114 is touched off.

Korean vowels can be recognized as an input and displayed (or conversion displayed) by the following user interfaces.

(1) 'ㅏ' touch off→'ㅑ' input recognition and display
(2) 'ㅗ' touch off→'ㅛ' input recognition and display
(3) 'ㅡ' touch off→'ㅡ' input recognition and display (4) '—' touch and drag off to the character output region (common use region)→'ㅣ' recognition and conversion display (5) 'ㅏ' touch off and then '—' touch off→'ㅑ' input recognition and conversion display (6) 'ㅏ' touch off and then '—' touch and drag off to the character output region→'ㅐ' recognition and conversion display (7) 'ㅓ' touch off and then '—' touch off→'ㅕ' input recognition and conversion display (8) 'ㅓ' touch off then '—' touch and drag off to the character output region→'ㅔ' recognition and conversion display (9) 'ㅗ' touch off and then '—' touch off→'ㅛ' input recognition and conversion display

(10) 'ㅗ' touch off and then '—' touch and drag off to the character output region→'ㅚ' recognition and conversion display

(11) 'ㅜ' touch off and then '—' touch off→'ㅠ' input recognition and conversion display

(12) 'ㅜ' touch off and then '—' touch and drag off to the character output region→'ㅟ' recognition and conversion display

(13) 'ㅗ' display (input) and then 'ㅏ' touch→'ㅘ' recognition and conversion display

(14) 'ㅘ' display (input) and then '—' touch and drag off to the character output region→'ㅙ' recognition and conversion display Korean mid vowels may be recognized as an input and displayed (or conversion displayed) by the following user interfaces.

(1) 'ㅏ' touch off ('ㅏ' input) and then (+) button touch off→'ㅑ' recognition and conversion display (2) 'ㅏ' touch off ('ㅏ' input) and then (+) button touch and drag off to the character output region (common use region)→'ㅒ' recognition and conversion display (3) 'ㅐ' display (input) and then the character output region touch off→'ㅒ' recognition and conversion display (4) 'ㅗ' touch and then drag off to the character output region→'ㅜ' recognition and conversion display (5) 'ㅜ' display ('ㅜ' input) and then (+) button touch off→'ㅠ' recognition and conversion display (6) 'ㅜ' display ('ㅜ' input) and then (+) button touch and drag off to the character output region (common use region)→'ㅞ' recognition and conversion display (7) 'ㅞ' display ('ㅞ' input) and then the character output region touch off→'ㅙ' recognition and conversion display (8) 'ㅞ' display ('ㅞ' input) and then the character output region touch off→'ㅙ' recognition and conversion display Referring to FIG. 1B, when a 'g' button in the character display region 112 is touched off by the user interface, 'g' is recognized as an input and displayed on a predetermined position of the character output region 114. When the 'g' button is touched and dragged off to the character output region 114, a matching character 'h' matched with the 'g' character of the 'g' button can be recognized as an input and displayed on the predetermined position of the character output region 114.

In the alphabet recognition method as well as in the Korean recognition method, an alphabet (or matching alphabet) recognized as an input alphabet (input character) and displayed on the character output region 114 by touch off or drag off can be changed to and displayed as (changed to and recognized and displayed as) a next alphabet (next character) or a previous alphabet (previous character) in the alphabetical order (dictionary order).

In FIG. 1B, a '↑' button positioned between a 'w' button and a 'u' button in the character display region 112 can be utilized as an alphabet capital lock key. When the '↑' button is touched and dragged off to the character output region (common use region), it is converted to and displayed as a caps lock key. In FIGS. 1A and 1B, when a back space key is dragged off to the common use region, it is changed to and displayed as a non-display '←' key matched therewith. When the space key is dragged off to the common use region, it is changed to and displayed as a non-display '→' key matched therewith. When the enter key is dragged off to the common use region, it is changed to and displayed as a non-display delete key matched therewith.

Figure 2:
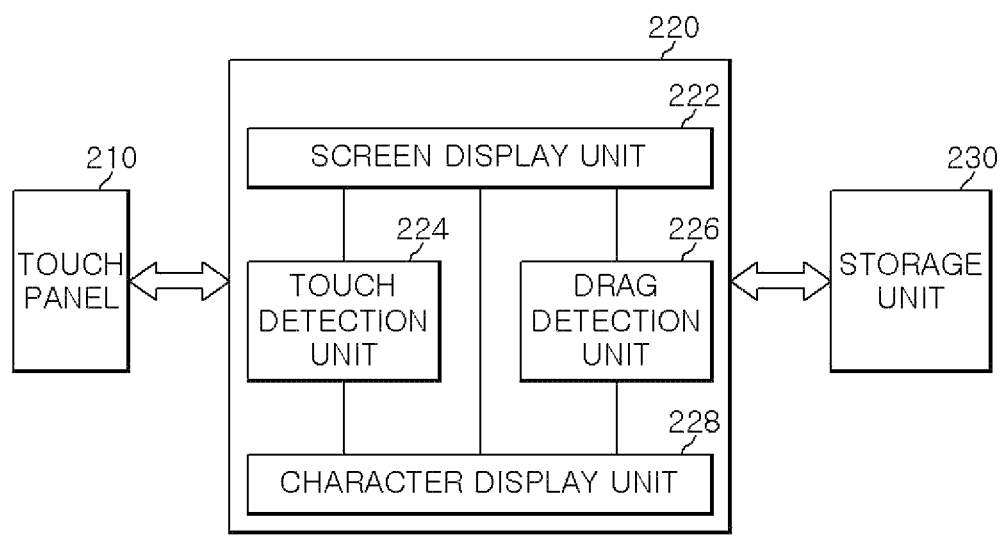
FIG. 2 is a block diagram of a character recognition apparatus according to the first embodiment.

FIG. 2 is a block diagram of the character recognition apparatus according to the first embodiment. The character recognition apparatus may include a touch panel 210, a signal processing block 220, a storage unit 230 or the like. The signal processing unit 220 may include a screen display unit 222, a touch detection unit 224, a drag detection unit 226, a character display unit 228 or the like. A part or all of the components constituting the signal processing block 220 can be collectively realized by a microprocessor and can also be realized in the form of an application.

Referring to FIG. 2, the touch panel 210 may be a touch-type display panel such as an OLED, LED, LCD or the like which is installed at a small-sized wearable device, e.g., a smart watch or the like. In order to realize the character recognition of the present embodiment, a character input screen (e.g., Korean character input screen, alphabet character input screen or the like) including a character output region serving as a common use region, a character display region, or the like may be displayed on the touch panel 210.

The screen display unit 222 in the signal processing block 220 can generate a character input screen including a character output region serving as a common use region, a character display region having a plurality of buttons (e.g., character buttons, function key buttons, symbol buttons and the like) indicating a plurality of characters, function keys, symbols and the like in the case of transmitting a user touch signal for character input from the touch detection unit 224, and the like. In other words, the screen display unit 222 can display the character input screen taking from the storage unit 230 on the touch panel 210.

For example, in a touch panel having a square shape, the character display region in the character input screen may be arranged (formed) around four sides thereof. Each of the character buttons (e.g., Korean consonant and vowel buttons, English alphabet buttons and the like) is assigned with a matching character matched with the character displayed on the button, i.e., a non-display matching character. The non-display matching character may be a next character of the character displayed on the corresponding button in the dictionary order.

Therefore, the storage unit 230 stores therein a plurality of screen data required for character input and data on characters (e.g., Korean consonants and vowels, English alphabet and the like) of various languages (e.g., Korean, English and the like) for character input.

The touch detection unit 224 includes, e.g., a capacitive touch sensor or the like, and thus can detect touch for character input, i.e., touch or touch off of buttons (e.g., character buttons, number buttons, function key buttons, icon buttons and the like) displayed in the character display region 112. A detected touch signal or a detected touch off signal of the buttons may be transmitted to the screen display unit 222 or to the character display unit 228.

Further, the touch detection unit 224 can detect touch or touch off in the character output region 114 as the common use region and transmit the detection result to the character display unit 228. The touch or the touch off in the character output region 114 may indicate an interface executed by a user to correct an input character to a next or a previous character in the dictionary order (or in the alphabetical order).

The drag detection unit 226 can detect drag of the touch (button touch) in the character display region 112 to the character output region 114 as the common use region without touch off and also can detect drag off in the character output region 114 and transmit the detection result to the screen display unit 222 or to the character display unit 228.

The character display unit 228 can recognize, when a touch off signal for a certain character button is transmitted from the touch detection unit 224, a character of the corresponding character button as an input and display the character on the character output region 114. Further, the character display unit 228 can recognize, when a drag off signal is transmitted from the drag detection unit 226, a matching character matched with the character of the dragged character button as an input and display the matching character on the character output region 114.

Whenever the touch off is detected in the character output region 114 within a predetermined time by the user interface in a state where a certain character (e.g., 'ㄷ') is displayed on the character output region 114, the character display unit 228 can sequentially change and display the character displayed on the character output region 114 to next characters (e.g., 'ㄹ', 'ㅁ', 'ㅂ') in the dictionary order.

The character display unit 228 can change the character displayed on the character output region 114 to a previous character in the dictionary order (e.g., 'ㄷ') when the touch is maintained for a predetermined time in the character output region 114 by the user interface in a state where a certain character (e.g., 'ㄹ') is displayed on the character output region 114 and the touch is released within a predetermined time. The character display unit 228 can sequentially change the corresponding character displayed on the character output region 114 to previous characters in the dictionary order (e.g., 'ㄴ' and 'ㄱ') whenever the touch off is detected within the predetermined time in a state where the character (e.g., 'ㄷ') is displayed.

The character display unit 228 can recognize, when the touch of the function key button is dragged off to the character output region, a non-display matching function key matched with the function key as an input and display the non-display matching function key.

The following is detailed description of a series of processes of selectively inputting a character displayed on a button or a non-display matching character by using the character recognition apparatus of the present embodiment which is configured as described above.

Figure 3:
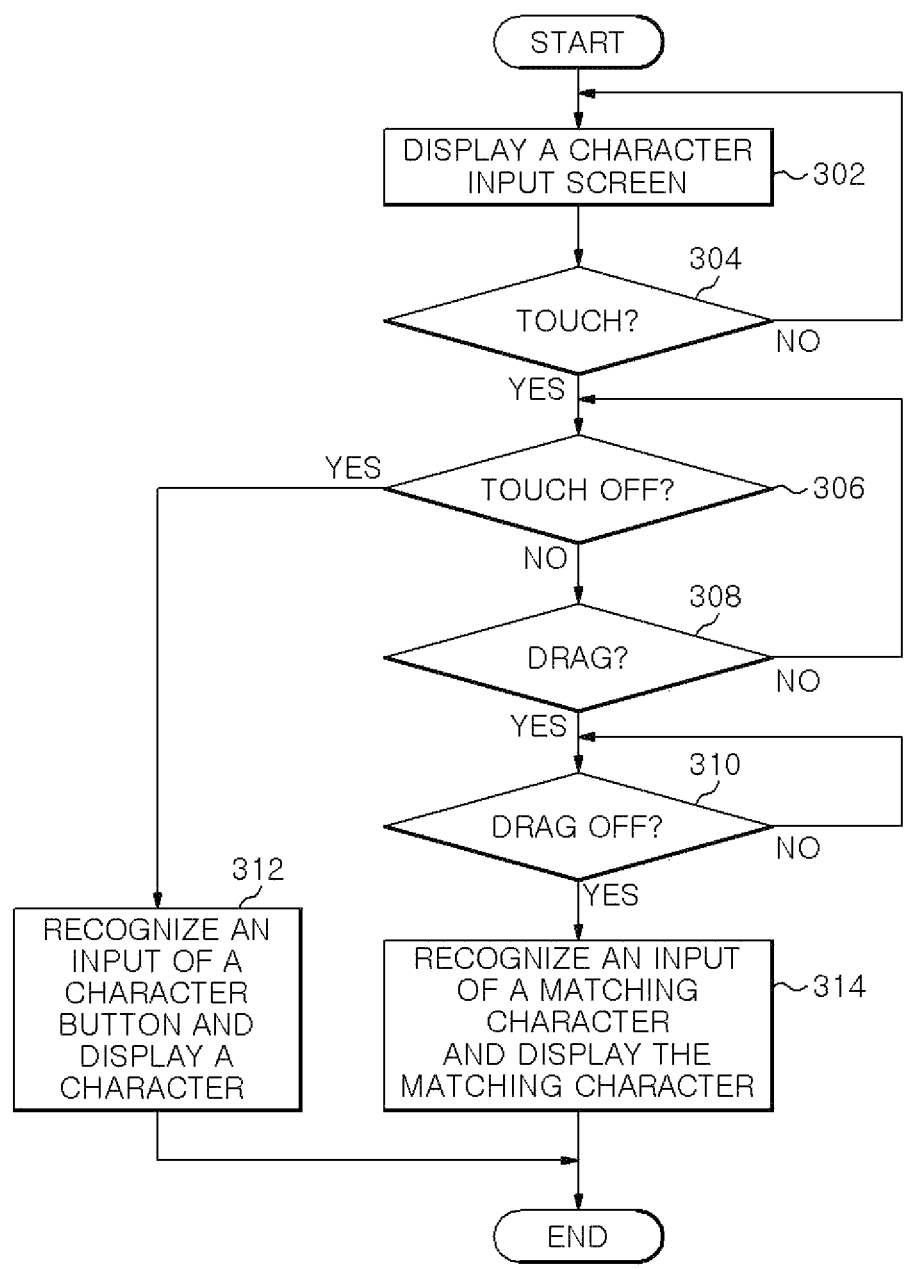
FIG. 3 is a flowchart showing main processes of recognizing an input character by using a character output region as a common use region in the first embodiment.

FIG. 3 is a flowchart showing main processes of recognizing an input character by using the character output region as the common use region in the first embodiment.

Referring to FIG. 3, when the user interface for character input, e.g., touch of a character icon displayed on a touch panel or the like, is detected by the touch detection unit 224, the screen display unit 222 displays on the touch panel the character input screen 110 including the character display region 112 and the character output region 114 as the common use region as shown in FIGS. 1A and 1B (step 302).

The character display region 112 in the character input screen may be provided with a plurality of buttons (e.g., character buttons, function key button, symbol buttons and the like) indicating a plurality of characters, function keys, symbols and the like. In a touch panel having a square structure, the character display region 112 may be arranged (formed) around four sides thereof.

The touch detection unit 224 detects touch of any one of buttons on the character display region 112 (step 304). For example, when the touch of the character button is detected, it is checked (monitored) whether or not the touch off of the corresponding character button occurs (step 306).

If the touch off of the corresponding character button is detected in the step 306, the character display unit 228 recognizes the character displayed on the corresponding character button as a input and displays the character on the character output region 114 (step 312).

For example, when 'ㅣ' is touched off in the Korean input screen shown in FIG. 1A, the character display unit 228 displays 'ㄷ' in the character output region 114. For example, 'k' is touched off in the alphabet input screen shown in FIG. 1B, the character display unit 228 displays 'k' in the character output region 114.

The drag detection unit 226 detects whether or not the touch of the character button is dragged to the character output region 114 as the common use region without touch off (step 308). When the drag is detected, it is checked (monitored) whether or not the drag off occurs in the character output region 114 (step 310).

If the drag off to the character output region 114 is detected in the step 310, the character display unit 228 recognizes a non-display matching character matched with the character of the corresponding character button as an input and displays the non-display matching character on the character output region 114 (step 314). Here, the non-display matching character may indicate a next character of the character matched therewith in the dictionary order (or in the alphabetical order).

For example, as shown in FIG. 1A, when a 'ㅣ' character button in the character display region 112 is touched and dragged off to the character output region 114, a non-display 'ㄹ' character matched with the 'ㄷ' character is recognized as an input and displayed on a predetermined position of the character output region 114. For example, as shown in FIG. 1B, when a 'g' character button in the character display region 112 is touched and dragged off to the character output region 114, a non-display 'h' character matched with the 'g' character is recognized as an input and displayed on a predetermined position of the character output region 114.

Figure 4:
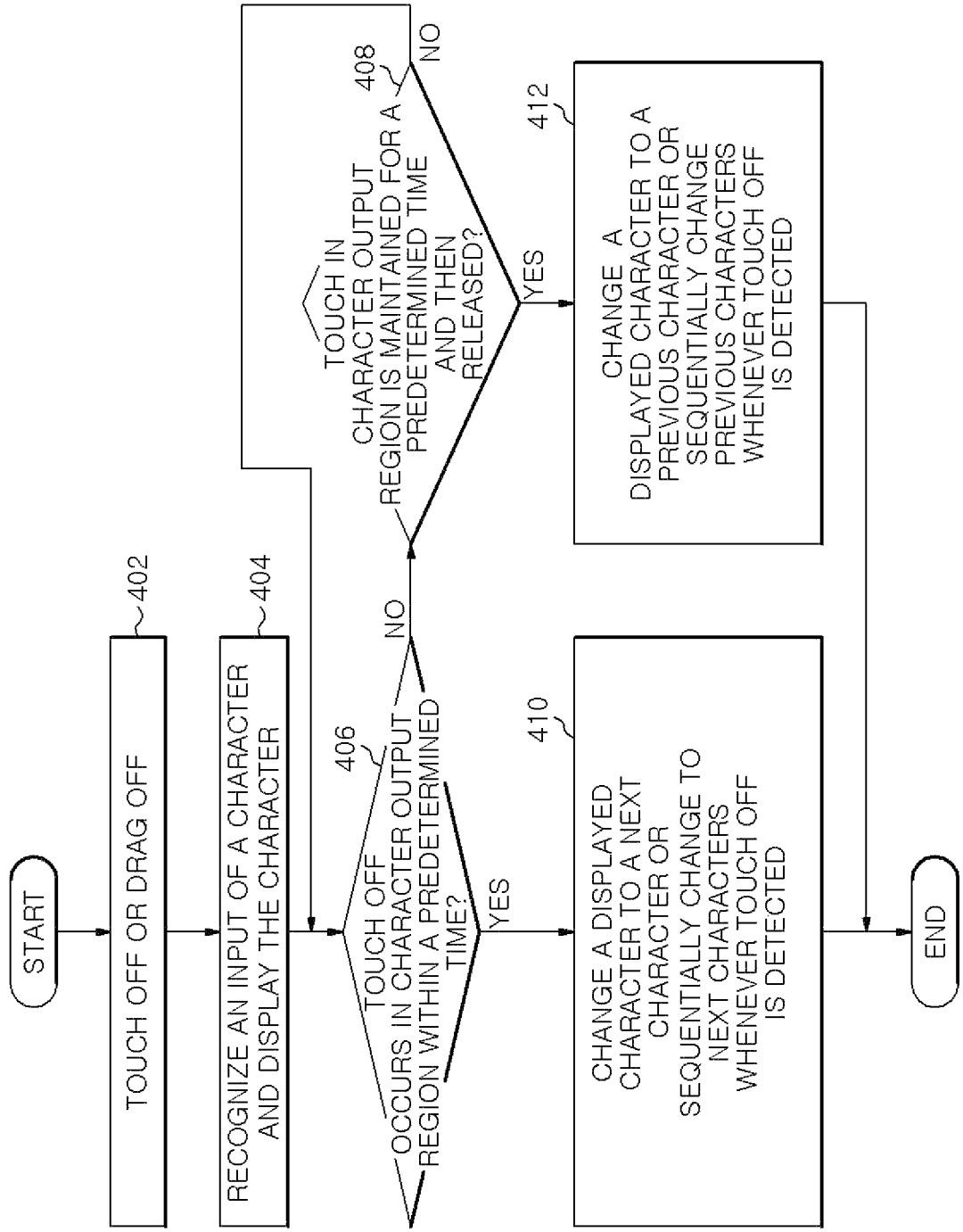
FIG. 4 is a flowchart showing main processes of changing the input character to a next or a previous character by using the common use region in the first embodiment.

FIG. 4 is a flowchart showing main processes of changing an input character to a next or a previous character by using the common use region in the first embodiment.

Referring to FIG. 4, when the touch off of a certain character button in the character display region 112 or the drag off to the character output region 114 is detected (i.e., when the input character is recognized) (step 402), the character display unit 228 displays the character or the matching character in the character output region 114 (step 404).

Then, the character display unit 228 checks (monitors) whether or not the touch off occurs in the character output region 114 within a predetermined time (step 406) or whether or not the touch in the character output region 114 is maintained for a predetermined time and then released (step 408).

Whenever the touch off is detected in the character output region 114 within the predetermined time in the step 406, the character display unit 228 sequentially changes the corresponding character displayed on the character output region 114 to next characters in the dictionary order (step 410).

For example, whenever the touch off is detected in the character output region 114 within a predetermined time after the input of the 'ㄷ' character in a state where the 'ㄷ' character is displayed on the character output region 114, the 'ㄷ' character can be sequentially changed to and displayed as next characters 'ㄹ', 'ㅁ', 'ㅂ' and the like in the dictionary order. Therefore, when a previous character of a desired character is mistyped, it is possible to immediately change the mistyped character to the desired character without deleting the mistyped character.

If the touch in the character output region 114 is maintained for a predetermined time and then released in the step 408, the character display unit 228 changes the corresponding character displayed on the character output region 114 to a previous character in the dictionary order (step 412).

For example, when where the 'ㄹ' character is displayed on the character output region 114 and the touch in the character output region 114 is maintained for a predetermined time and then released within a predetermined time after the input of the 'ㄹ' character, the 'ㄹ' character is changed to a previous character, i.e., the 'ㄷ' character, in the dictionary order. Whenever the touch off in the character output region 114 is detected within the predetermined time in a state where the 'ㄷ' character is displayed, the corresponding character displayed on the character output region 114 is sequentially changed to previous characters 'ㄴ' and 'ㄱ'. Accordingly, when a next character of a desired character is mistyped, it is possible to immediately change the mistyped character to the desired character without deleting the mistyped character.

Figure 5A:
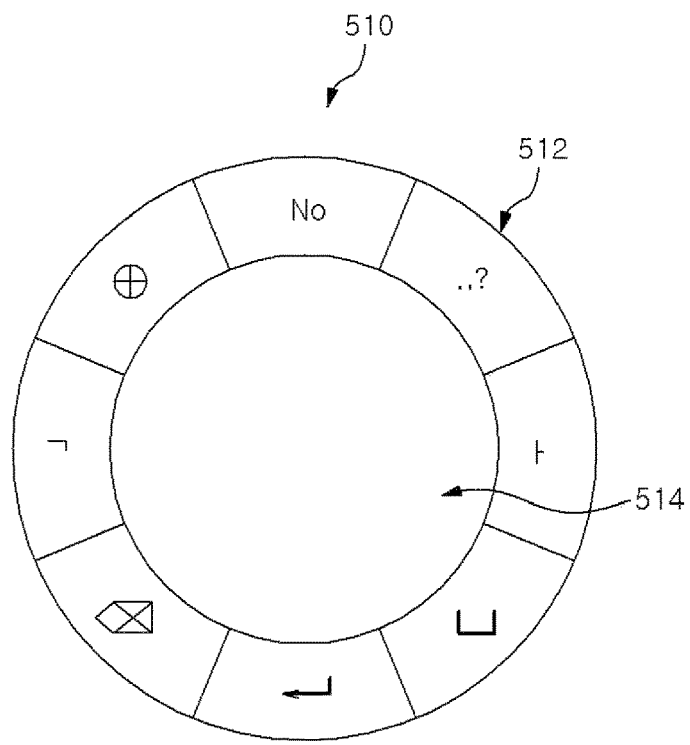
FIGS. 5A to 5F show examples of a screen where a character recognition method according to a modification of the first embodiment is performed.
Figure 5B:
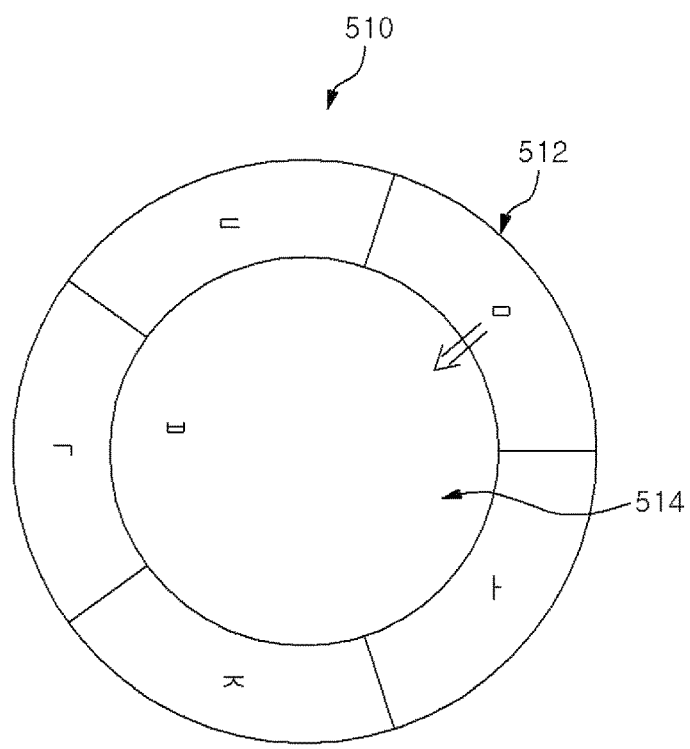

Although the square touch panel shown in FIGS. 1A and 1B is used in the present embodiment, the present embodiment is not limited thereto and a circular touch panel shown in FIGS. 5A and 5B may also be used.

FIGS. 5A to 5F show examples of a screen for performing the character recognition method according to a modification of the first embodiment of the present disclosure.

Figure 5C:
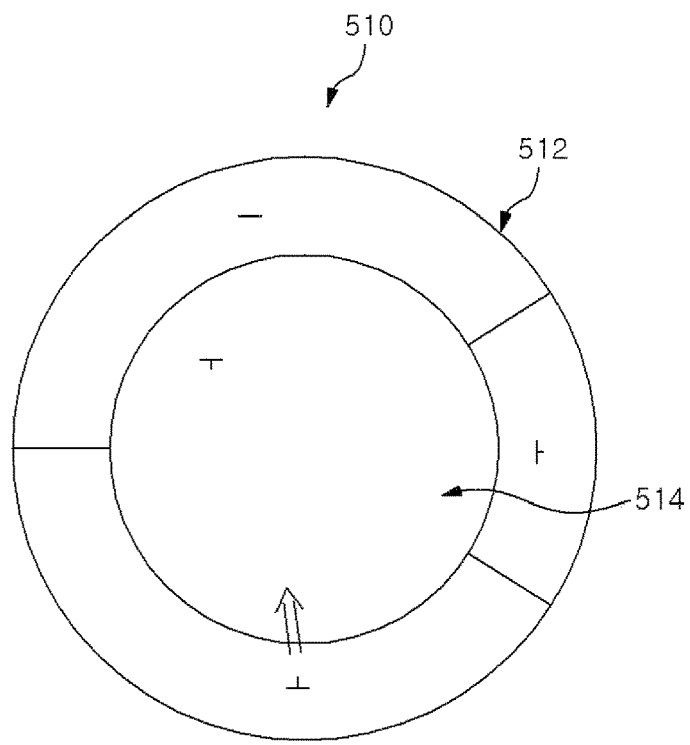

Referring to FIG. 5A, when a user selects (touches) a 'ㄱ' button (representative consonant button) in the character input screen (or main input screen) 510 in order to input a Korean consonant, the current character input screen is switched to a consonant input screen as shown in FIG. 5B. When a user selects (touches) a 'ㅏ' button (representative vowel button) in the character display region 512 in the character input screen in order to input a Korean vowel, the current character input screen is switched to a vowel input screen as shown in FIG. 5C. A reference numeral 514 denotes a character output region serving as a common use region.

As in the case of the character buttons shown in FIGS. 1A and 1B, each of the character buttons in the character display region 512 is matched with a non-display next character in the dictionary order (or in the alphabetical order). The input recognition and the display of each character or each matching character may be performed by the same interface (touch off or drag off) as that in FIGS. 1A and 1B.

When any consonant character (or non-display consonant matching character) is recognized as an input and displayed by touch off or drag off in the consonant input screen shown in FIG. 5B, the screen is returned to the main input screen shown in FIG. 5A. When any vowel character (or non-display vowel matching character) is recognized as an input and displayed by touch off or drag off in the vowel input screen shown in FIG. 5C, the screen is returned to the main input screen shown in FIG. 5A.

An aspirated consonant, e.g., a 'ㅋ' character, can be inputted (recognized and displayed as an aspirated consonant) by inputting a 'ㄱ' character and touching off a preset function key button (e.g., (+) button or the like) of the main input screen 510 by the user interface. A hard consonant, e.g., a 'ㄲ' character, can be inputted (recognized and displayed as a hard consonant) by touching the preset function key button (e.g., (+) button or the like) of the main input screen 510 and dragging it off to the character output region 514 as the common use region or by inputting (conversion displaying) the 'ㅋ' character and touching off the character output region 514.

A vowel can be inputted by the interface that is the same as or similar to that in FIGS. 1A and 1B.

For example, when the (+) button is touched off in the main input screen after the input of a 'ㅜ' character, the 'ㅜ' character is converted to and displayed as a 'ㅠ' character. When the (+) button is touched and dragged off to the character output region 514 as the common use region, the 'ㅜ' character is converted to and displayed as a 'ㅝ' character. When the character output region 514 is touched off after the input of the 'ㅝ' character, the 'ㅝ' character is converted to and displayed as a 'ㅞ' character. When the character output region 514 is touched off again, it is converted to and displayed as a 'ㅟ' character.

Figure 5D:
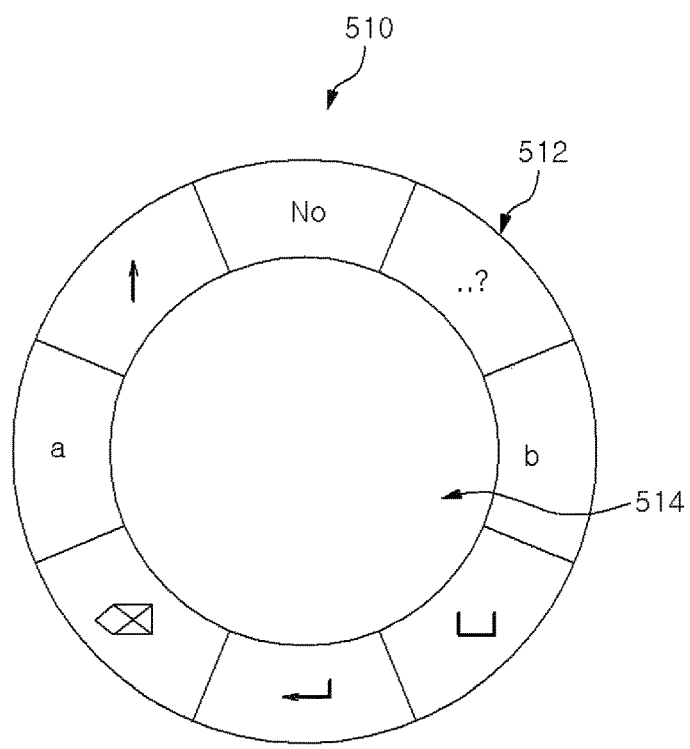

When any button, e.g., a 'No' button, is selected (touched) in the main input screen shown in FIG. 5A in order to input an alphabet, the character input screen can be switched to an alphabet input screen shown in FIG. 5D. Here, an 'a' button may indicate a representative vowel character in the alphabet and a 'b' button may indicate a representative consonant character in the alphabet.

Figure 5E:
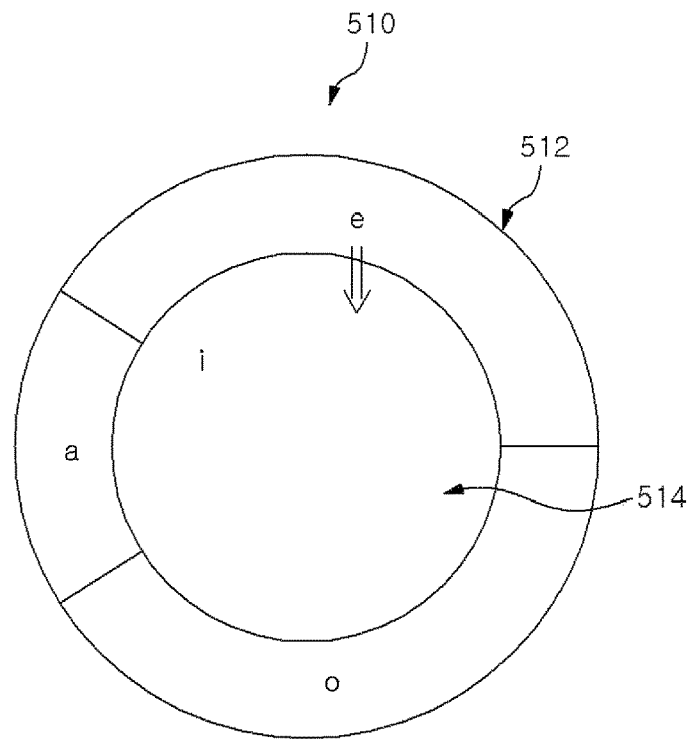

Referring to FIG. 5D, when the 'a' button in the character display region 512 is touched, the screen of the touch panel is switched to the alphabet vowel input screen shown in FIG. 5E. When the 'b' button in the character display region 512 is touched, the screen of the touch panel is switched to the alphabet consonant input screen shown in FIG. 5F. As in the case of the Korean input screen, each of the vowel buttons and each of the consonant buttons are matched with a non-display matching character that is a previous character in the alphabetical order.

Therefore, a user can input (recognize and display an input) a desired alphabet character by the user interface such as touch off or drag off of a vowel button and a consonant button.

Figure 5F:
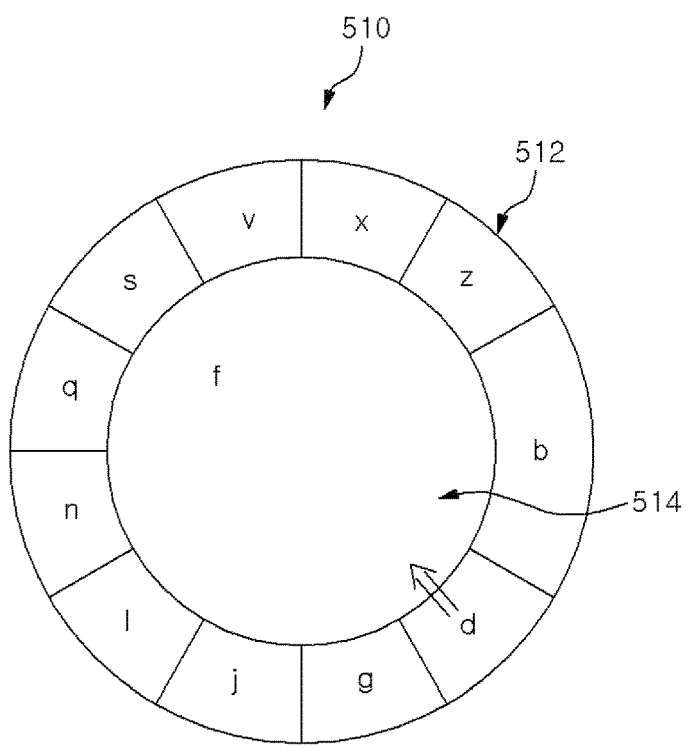

For example, when the 'b' button is touched on the screen shown in FIG. 5D, the screen is switched to a screen shown in FIG. 5F. When the touch of the 'b' button is dragged to a 'd' button on the screen shown in FIG. 5F and then dragged off to the character output region as the common use region, a 'f' character as a consonant character which is matched with the 'd' character can be recognized as an input and displayed.

Referring to FIG. 5D, a '↑' button between the 'a' button and the 'No' button in the character display region 512 can be utilized as an alphabet capitals lock key. When the touch of the '↑' button is dragged off to the character output region (common use region), it is converted to and displayed as a caps lock key. When a back space key is dragged off to the common use region in FIGS. 5A and 5D, it is converted to and displayed as a non-display '←' key matched therewith. When the space key is dragged off to the common use region, it is converted to and displayed as a non-display '→' key matched therewith. When the enter key is dragged off to the common use region, it is converted to and displayed as a non-display delete key matched therewith.

Second Embodiment

FIGS. 6A to 6D show examples of a screen for performing a character recognition method according to a second embodiment of the present disclosure.

Figure 6A:
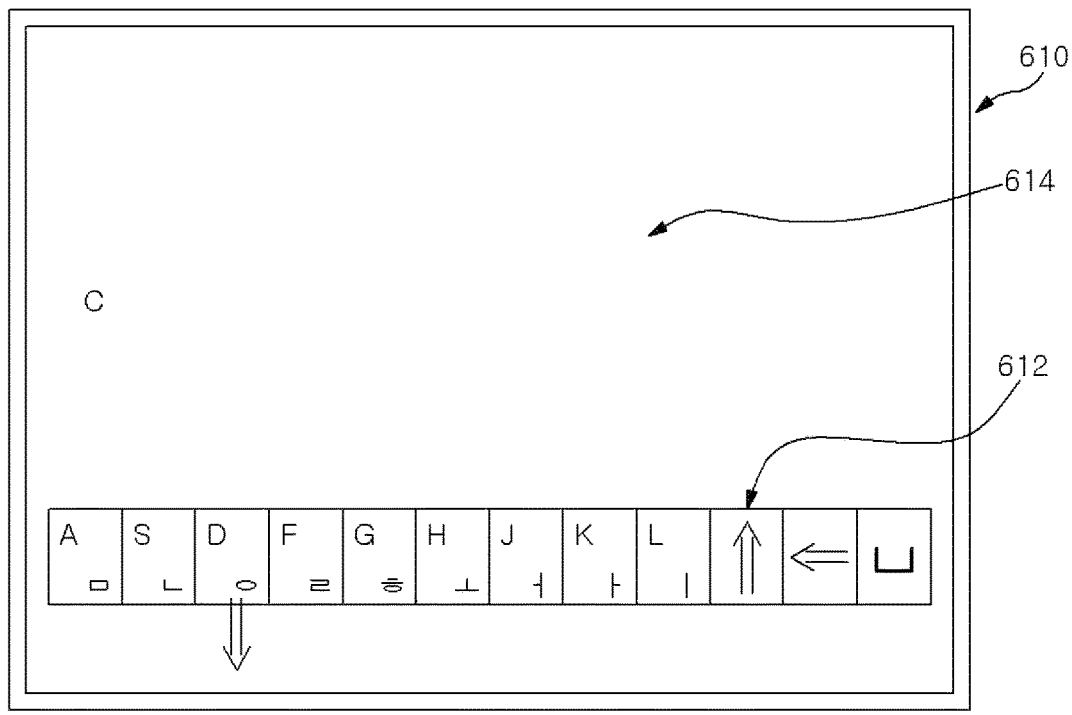
FIGS. 6A to 6D show examples of a screen where a character recognition method according to a second embodiment of the present disclosure is performed.

Referring to FIG. 6A, a character input screen 610 displayed on a touch panel (touch-type small-sized display panel) attached (installed) to a small-sized terminal (e.g., a small-sized wearable device such as a smart watch or the like) may include, e.g., a character display region 612, a character output region 614, or the like.

The character display region 612 in the character input screen may be provided with buttons in the middle row of a qwerty keyboard (e.g., ㅁ, ㄴ, ㅇ, ㄹ, ㅎ, ㅗ, ㅓ, ㅏ, ㅣ buttons of Korean and A, S, D, F, G, H, J, K, L buttons of Alphabet which are concurrently displayed), a shift button ('↑') and the like. For example, in a touch panel having a square structure, the buttons may be arranged (formed) at predetermined positions of the lower end portion of the screen.

The keyboard buttons in the middle of the character display region 612 may be character buttons defined as a touch button or a touch key. A single character in each of the character buttons (keyboard buttons) may be assigned with two non-display matching characters matched therewith. In other words, a character displayed on the character button may be assigned with an upper matching character as an upper pair and a lower matching character as a lower pair.

For example, a Korean 'ㄹ' button can be matched with a non-display upper matching character, i.e., a 'ㄱ' character adjacent thereto in an upper left direction in the arrangement structure of the qwerty keyboard (upper pair matching) and with a non-display lower matching character, i.e., a 'ㅍ' character adjacent thereto in a lower right direction in the arrangement structure of the qwerty keyboard (lower pair matching).

For example, an alphabet 'S' button can be matched with a non-display upper matching character, i.e., a 'W' character adjacent thereto in the upper left direction in the arrangement structure of the qwerty keyboard (upper pair matching) and with a non-display lower matching character, i.e., a 'X' character adjacent thereto in the lower right direction in the arrangement structure of the qwerty keyboard (lower pair matching).

A 'shift' function key can be matched with a non-display upper matching function key, i.e., a 'back space' function key, in an upward direction (upper pair matching), a non-display lower matching function key, i.e., a 'space' function key, in a downward direction (lower pair matching), and a non-display right matching function key, i.e., an 'enter' function key, in a right direction (right pair matching). Or, the 'shift' key can be matched with the 'enter' key by pressing the 'shift' key for a while in a forward direction.

The character output region 614 in the character input screen 610 displays a character or a matching character (upper matching character or lower matching character) inputted (recognized as an input) by a user's touch off interface or a user's drag off interface.

Since the character button in the character display region is touched and dragged off to display the upper matching character, the character output region 614 can be defined as the common use region for recognition of the upper matching character.

Referring to FIG. 6A, when a 'D' button in the character display region 612 is touched off by the user interface in the alphabet input mode, a consonant 'D' is recognized as an input and displayed on a predetermined position of the character output region 614. When the 'D' button is touched and dragged off to the character output region 614 in the upper outer side of the character display region 612, a non-display vowel 'E' that is an upper matching character matched as an upper pair with the 'D' character of the 'D' button is recognized as an input and displayed on a predetermined position of the character output region 614. When the 'D' button is touched and dragged off to the lower outer side of the character display region 612, a non-display consonant 'C' that is a lower matching character matched as a lower pair with the 'D' character of the 'D' button is recognized as an input and displayed on a predetermined position of the character output region 614. Here, the 'non-display' may indicate that the corresponding character (upper matching character and lower matching character) is not displayed as a character button on the character display region 612.

Therefore, in the present embodiment, a user can select and input any one of three characters with a single button by the touch off interface or the drag off interface (the drag off interface to the upper outer side and the drag off interface to the lower outer side) of a button forming the keyboard buttons in the middle row of the qwerty keyboard.

In the character recognition method of the present embodiment, the character recognized as an input character and displayed on the character output region by the touch off of the keyboard button in the character display region can be changed to and displayed as the non-display upper matching character adjacent thereto in the upper left direction or the lower matching character adjacent thereto in the lower right direction in the arrangement structure of the qwerty keyboard.

For example, by touching off the character output region 614 in the upper outer side of the character display region 612 within a predetermined time (e.g., 1 second, 1.5 seconds, 2 seconds or the like) in a state where 'ㅇ' is inputted by touching off an 'ㅇ' button in the Korean input mode, the 'ㅇ' character can be changed to and displayed as (changed to and recognized as) the 'ㄴ' character matched therewith as the upper pair, and sequentially changed to and displayed as (changed to and recognized as) (e.g., 'ㄱ', 'ㄹ', 'ㅅ', ...) a character adjacent thereto in the upper right direction of the keyboard and a character matched therewith (e.g., 'ㄱ', 'ㄹ', 'ㅅ', ...) whenever the touch is made.

By touching off the lower outer side of the character display region 612 within a predetermined time (e.g., 1 second, 1.5 seconds, 2 seconds or the like), the 'ㅇ' character can be changed to and displayed as (changed to and recognized as) a 'ㅈ' character matched therewith as the lower pair, and sequentially changed to and displayed as (changed to and recognized as) a character adjacent thereto in the lower right direction of the keyboard and a character matched therewith (e.g., 'ㄹ', 'ㅍ', 'ㅎ', . . . ) whenever the touch is made.

By touching the upper outer side of the character display region 612 for a predetermined time (e.g., 1.5 seconds, 2 seconds, 2.5 seconds, 3 seconds or the like) in a state where 'ㅇ' is inputted by touching off the 'ㅇ' button in the Korean input mode and then releasing the touch, the 'ㅇ' character can be changed to and displayed as (changed to and recognized as) a 'ㅈ' character matched as the upper pair with a 'ㄴ' character that is a previous character of the 'ㅇ' character. Whenever the touch is made, it can be sequentially changed to and displayed as (changed to and recognized as) a character mated as the upper pair therewith and a character adjacent thereto in the upper left direction of the keyboard (e.g., 'ㄴ', 'ㅁ', 'ㄷ').

By touching the lower outer side of the character display region 612 for a predetermined time (e.g., 1.5 seconds, 2 seconds, 2.5 seconds, 3 seconds or the like) in a state where 'ㅇ' is inputted and then releasing the touch, the 'ㅇ' character can be changed to and displayed as (changed to and recognized as) a 'ㅌ' character matched as the lower pair with the 'ㄴ' character that is a previous character of the 'ㅇ' character. Whenever the touch is made, it can be sequentially changed to and displayed as (changed to and recognized as) a character matched as the lower pair therewith and a character adjacent thereto in the upper left direction of the keyboard (e.g., 'ㄴ', 'ㅁ', 'ㄱ').

The change and display (change and recognition) of the English alphabet can be performed in the same manner as that in the case of inputting Korean.

In other words, in the present embodiment, when a user mistypes a character close to a desired character in an upper left direction or in a lower right direction in the arrangement structure of the keyboard, a mistyped character can be easily changed to and displayed as (changed to and inputted as) the upper matching character or the lower matching character in the arrangement structure of the qwerty keyboard by a single touch off interface without a process of deleting the mistyped character and inputting a desired character by two or more user interfaces as in the conventional case.

In the present embodiment, the Korean characters such as 'ㄲ, ㄸ, ㅃ, ㅆ, ㅉ ㅐ, ㅔ' and the like can be inputted by inputting characters 'ㄱ, ㄷ, ㅂ, ㅅ, ㅈ, ㅐ, ㅔ' and the like and then touching off the shift key (↑ button) within a predetermined time.

Figure 6B:
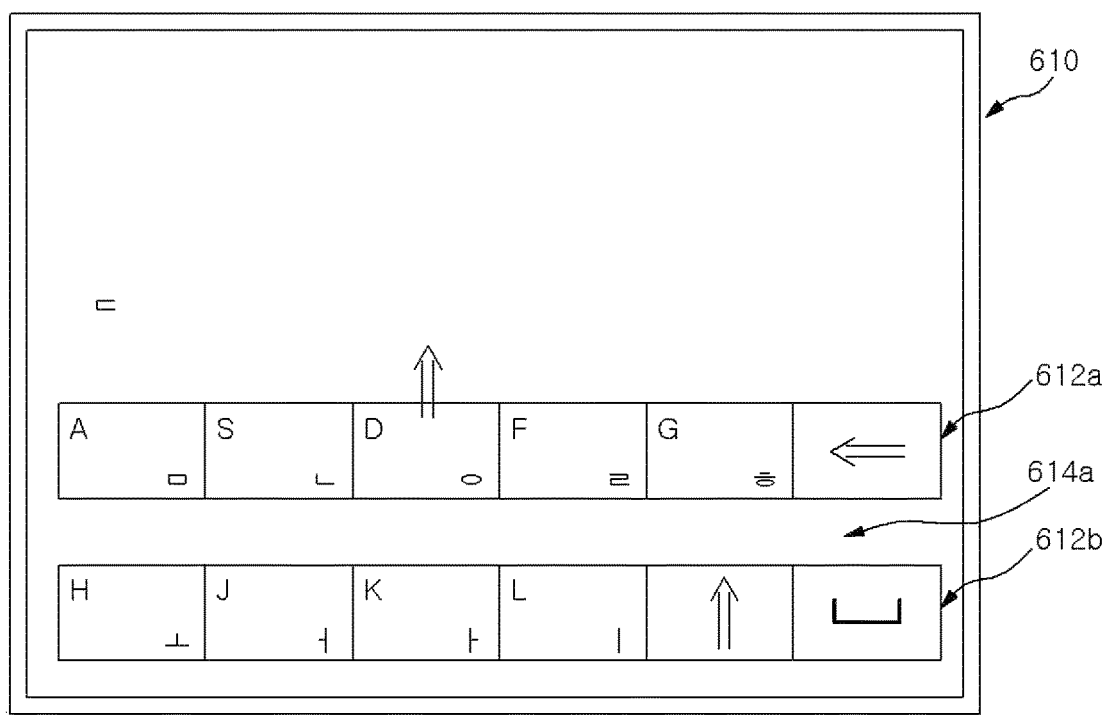

In the character recognition apparatus of the present embodiment, as shown in FIG. 6B, the character display region where the buttons in the middle of the qwerty keyboard are arranged is partitioned (divided) into a left hand input region 612a and a right hand input region 612b. The left hand input region 612a and the right hand input region 612b are arranged in an upper and a lower layer at a lower end portion of the character input screen 610.

Therefore, a region 614a positioned between the left hand input region 612a and the right hand input region 612b in this arrangement structure can be specified as a lower outer side when seen from the buttons displayed on the left hand input region 612a and as an upper outer side when seen from the buttons displayed on the right hand input region 612b. A desired character can be inputted by the same touch off or the same drag off as that in the arrangement structure shown in FIG. 6A.

For example, when a 'ㅇ' button in the left hand input region 612a is touched and dragged off to the character output region 614 in the upper outer side of the character display region 612 in the Korean input mode, a 'ㄷ' character matched as the upper pair with the 'ㅇ' character of the 'ㅇ' button is recognized as an input and displayed in a predetermined position of the character output region 614. When the 'ㅇ' button is touched and dragged off to the lower outer side region 614a, a 'ㅈ' character matched as the lower pair with the 'ㅇ' character of the 'ㅇ' button can be recognized as an input and displayed in a predetermined position of the character output region 614.

For example, when a 'ㅓ' button in the right hand input region 612b is touched and dragged off to the upper outer side region 614a in the Korean input mode, a 'ㅕ' character matched as the upper pair with the 'ㅓ' character of the 'ㅓ' button is recognized as an input and displayed in a predetermined position of the character output region 614. When the 'ㅓ' button is touched and dragged off to the lower outer side, a 'ㅡ' character matched as the lower pair with the 'ㅓ' character of the 'ㅓ' button can be recognized as an input and displayed in a predetermined position of the character output region 614.

The character of the keyboard button displayed on the character output region can be changed to and displayed as the upper matching character or the lower matching character by the same user interface as that in FIG. 6A.

Figure 6C:
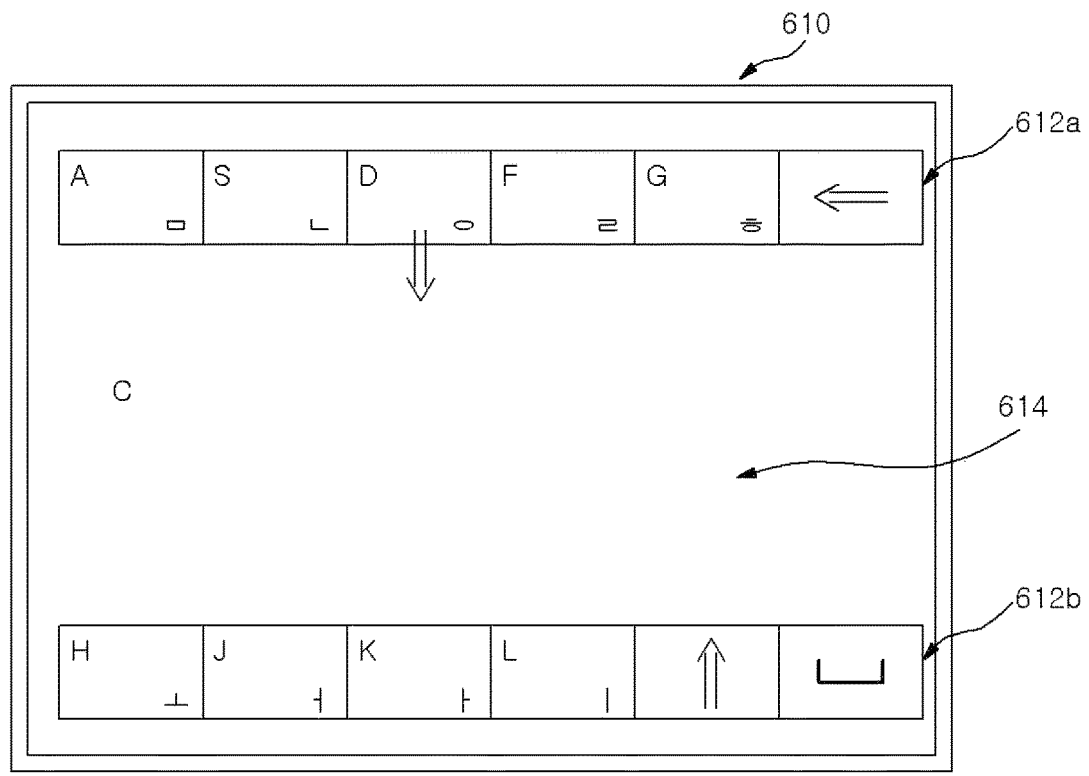

In the character recognition apparatus of the present embodiment, as shown in FIG. 6C, the character display region where the buttons in the middle row of the qwerty keyboard are arranged is partitioned (divided) into the left hand input region 612a and the right hand input region 612b. The left hand input region 612a can be positioned at a predetermined position of the upper end portion of the character input screen 610. The right hand input region 612b can be positioned at a predetermined position of the lower end portion of the character input screen 610.

Therefore, in this arrangement structure, the character output region 614 can be defined as a lower outer side when seen from the buttons displayed on the left hand input region 612a and as an upper outer side when seen from the buttons displayed on the right hand input region 612b. A desired character can be inputted by the same touch off or the same drag off as that in the arrangement structure shown in FIG. 6A.

For example, when a 'ㄴ' button in the left hand input region 612a is touched and dragged off to the upper outer side of the character display region 612 in the Korean input mode, a 'ㅈ' character matched as the upper pair with the 'ㄴ' character of the 'ㄴ' button is recognized as an input and displayed in a predetermined position of the character output region 614. When the 'ㄴ' button is touched and dragged off to the character output region 614 in the lower outer side, a 'ㅌ' character matched as the lower pair with the 'ㄴ' character of the 'ㄴ' button can be recognized as an input and displayed in a predetermined position of the character output region 614.

For example, when a '⊥' button in the right hand input region 612b is touched and dragged off to the character output region 614 in the upper outer side in the Korean input mode, a 'ㅛ' character matched as the upper pair with the '⊥' character of the '⊥' button is recognized as an input and displayed in a predetermined position of the character output region 614. When the '⊥' button is touched and dragged off to the lower outer side, a 'ㅜ' character matched as the lower pair with the '⊥' character of the '⊥' button can be recognized as an input and displayed in a predetermined position of the character output region 614.

The character of the keyboard button displayed on the character output region can be changed to and displayed as the upper matching character or the lower matching character by the same user interface as that in FIG. 6A.

In FIGS. 6A to 6C, the upper matching key of the shift key is 'ㅔ' in Korean and 'p' in English. The lower matching key of the shift key is the conversion key, which is indicated as 'No'.

The upper matching function key and the lower matching function key of the back space function key are the '←' key and the '→' key, respectively. The upper matching function key and the lower matching function key of the space function key are the delete key and the enter key, respectively.

Figure 6D:
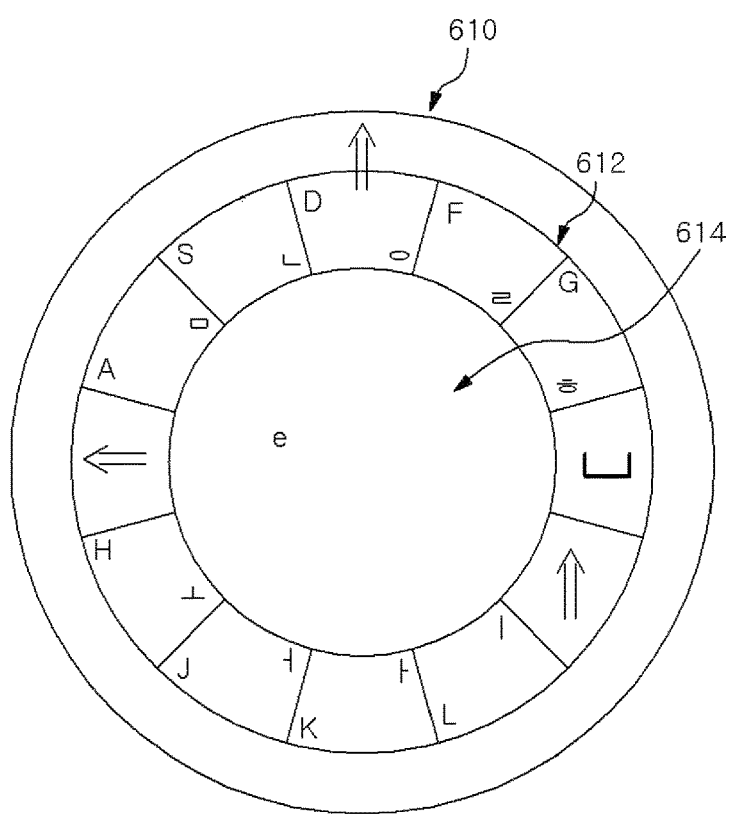

Referring to FIG. 6D, the qwerty keyboard is arranged in a circular shape. In other words, the character display region having the buttons in the middle row of the qwerty keyboard is arranged in a circular shape.

Referring to FIG. 6D, when a character in the character display region 612 is touched and dragged off to the common use region at the outside of the circle, a matching character in a first row in the qwerty keyboard is displayed in a predetermined position of the character output region 614. When it is dragged off to the character output region 614 at the inner side of the circle, a matching character in a third row in the qwerty keyboard is displayed on the character display region 614.

The character matched at the outer side of the circle with the shift key is 'p' in English and 'ㅔ' in Korean. The function key matched at the inner side of the circle with the shift key the 'No' conversion key.

The function key matched at the outer side of the circle with the backspace function key is the '←' key. The function key matched at the inner side of the circle with the backspace function key is the '→' key. The function key matched at the outer side of the space function key is the delete key. The function key matched at the inner side of the circle with the space function key is the enter key.

Figure 7:
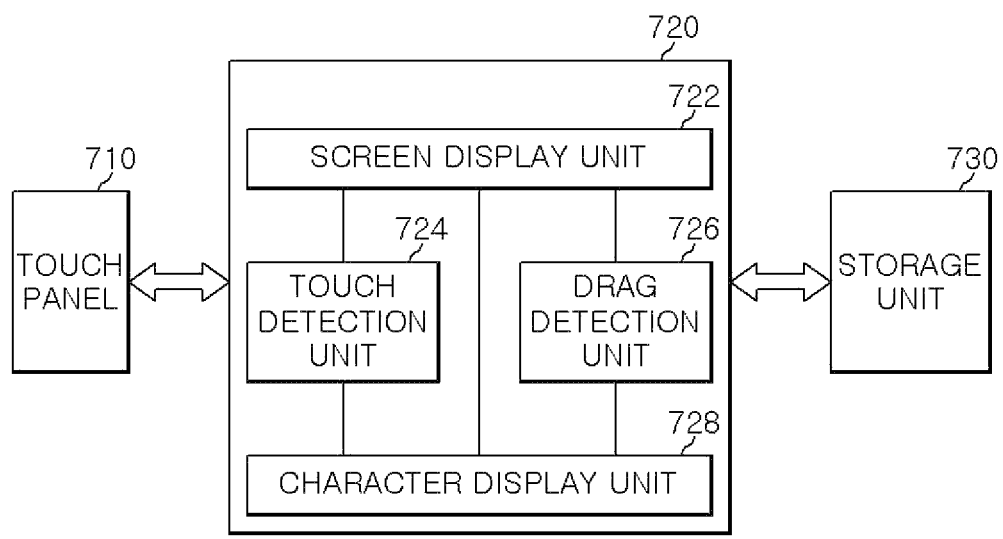
FIG. 7 is a block diagram of a character recognition apparatus according to the second embodiment.

FIG. 7 is a block diagram of the character recognition apparatus according to the second embodiment which includes a touch panel 710, a signal processing block 720, a storage unit 730 or the like. The signal processing block 720 may have a screen display unit 722, a touch detection unit 724, a drag detection unit 726, a character display unit 728 or the like. A part or all of the components of the signal processing block 720 can be collectively realized by the microprocessor and can also be realized in the form of application.

Referring to FIG. 7, the touch panel 710 corresponds to the touch panel 210 shown in FIG. 2; the screen display unit 722 corresponds to the screen display unit 222 shown in FIG. 2; the touch detection unit 724 corresponds to the touch detection unit 224 shown in FIG. 2; the drag detection unit 726 correspond to the drag detection unit 226 shown in FIG. 2; and the storage unit 730 correspond to the storage unit 230 shown in FIG. 2. The component corresponding to each other denote the same components having substantially the same functions. Therefore, detailed description thereof will be omitted for simple description.

The drag detection unit 726 can detect the drag and the drag off to the character output region 614 at the upper outer side of the character display region 612 and the drag and the drag off to the lower outer side of the character display region 612 and provide the detection result to the character display unit 728.

When the touch off signal of a certain character button (keyboard button) is transmitted from the touch detection unit 724, the character display unit 728 can recognize the character of the corresponding keyboard button as an input and display the character in the predetermined position of the character output region 614. When the upper drag off signal or the lower drag off signal is transmitted from the drag detection unit 726, the character display unit 728 can recognize the upper matching character or the lower matching character matched as the upper pair or the lower pair with the character of the dragged keyboard button as an input and display the upper matching character or the lower matching character in the predetermined position of the character output region 614.

When a certain character (e.g., 'ㅇ' character) is displayed on the character output region 614 and the touch off is detected in the character output region 614 in the upper outer side of the character display region 612 within a predetermined time by the user interface, the character display unit 728 can change the 'ㅇ' character displayed on the character output region 614 to a 'ㄴ' character that is the upper matching character adjacent thereto in the upper left direction in the arrangement structure of the qwerty keyboard.

When a certain character (e.g., 'ㅇ' character) is displayed on the character output region 614 and the touch off is detected in the lower outer side of the character display region 612 within a predetermined time by the user interface, the character display unit 728 can change the 'ㅇ' character displayed on the character output region 614 to a 'ㅈ' character that is the lower matching character adjacent thereto in the lower right direction in the arrangement structure of the qwerty keyboard.

When the touch of the function key button is dragged off to the character output region, the character display unit 728 can recognize a non-display matching function key matched with the function key button as an input and display the non-display matching function key.

The following is detailed description of a series of process of selectively inputting a character displayed on a button or a non-display upper or lower matching character by using the character recognition apparatus of the present embodiment which is configured as described above.

Figure 8:
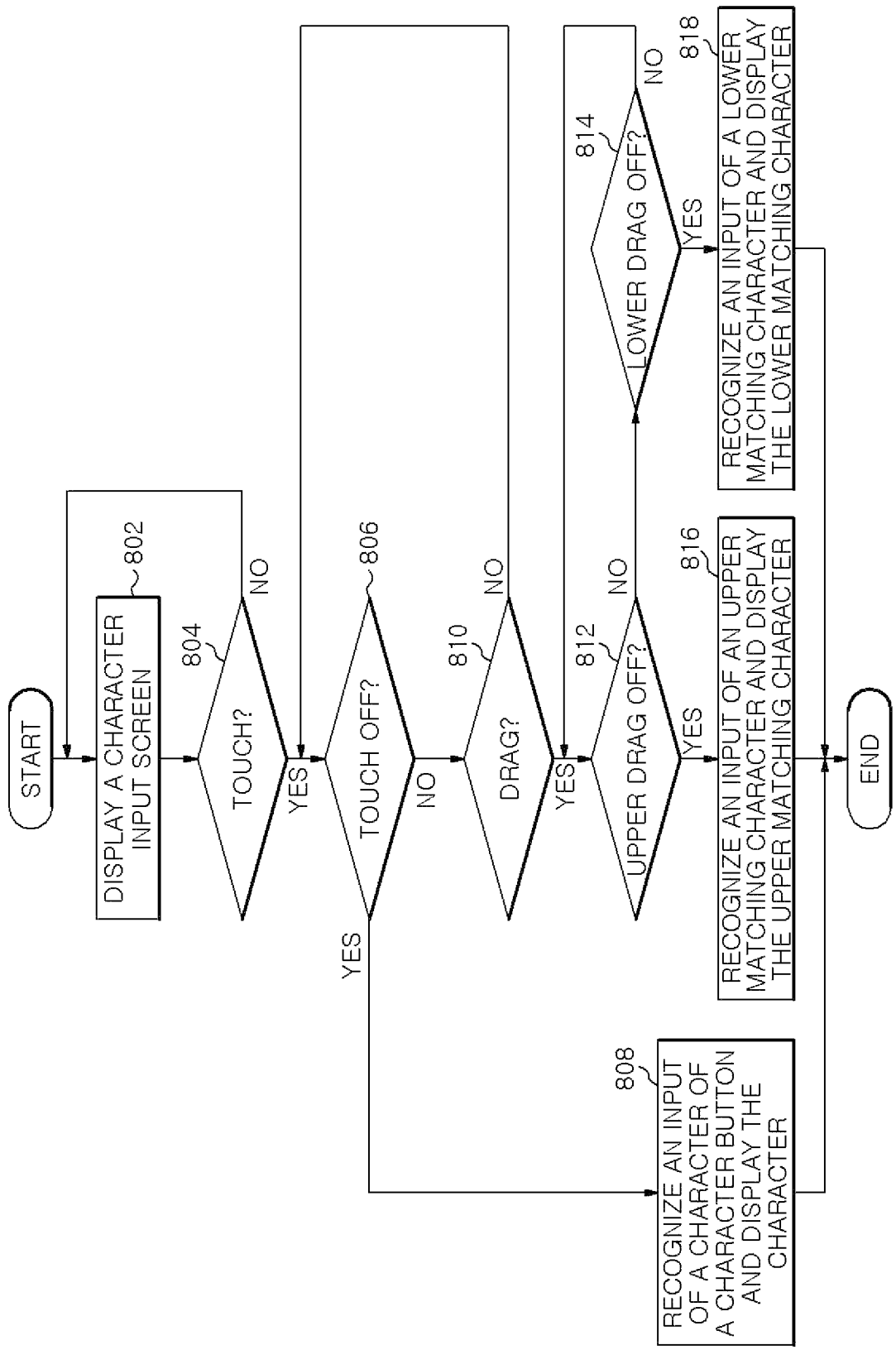
FIG. 8 is a flowchart showing main processes of recognizing an input character by using the character output region as the common use region in the second embodiment.

FIG. 8 is a flowchart showing main processes of recognizing an input character by using the character output region as the common use region in the second embodiment.

Referring to FIG. 8, when the user interface for character input, e.g., touch of a character icon displayed on a predetermined position of the touch panel or the like, is detected by the touch detection unit 724, the display unit 722 displays on the touch panel the character input screen 610 including the character display region 612 and the character output region 614 as the common use region as shown in FIG. 6A (step 802).

The character display region 612 in the character input screen may be provided with buttons in the middle row of the qwerty keyboard (e.g., ㅁ, ㄴ, ㅇ, ㄹ, ㅎ, ㅗ, ㅓ, ㅏ, ㅣ buttons of Korean and A, S, D, F, G, H, J, K, L buttons of alphabet which are concurrently displayed), the shift button (↑) and the like.

The touch detection unit 724 detects touch of any one of the keyboard buttons (character buttons) in the character display region 612 (step 804). For example, when the touch of the keyboard button is detected, it is checked (monitored) whether or not the touch off of the corresponding keyboard button occurs (step 806).

If the touch off of the corresponding keyboard button is detected in the step 806, the character display unit 728 recognizes the character displayed on the corresponding keyboard button as an input and displays the character in the predetermined position of the character output region 614 (step 808).

For example, when a 'ㅎ' character is touched off in the Korean input screen shown in FIG. 6A, the character display unit 728 displays the 'ㅎ' character in the character output region 614. For example, when a 'D' character is touched off in the alphabet input screen, the character display unit 728 displays the 'D' character in the character output region 614.

The drag detection unit 726 detects whether or not the touch of the keyboard button is dragged off to the outer side (upper outer side or lower outer side) of the character display region 612 without touch off (step 810). When the drag is detected, it is checked whether or not the drag off to the character output region 614 in the upper outer side of the character display region 612 occurs (step 812) or it is checked whether or not the drag off to the lower outer side of the character display region 612 occurs (step 814).

If the drag off to the character output region 614 in the upper outer side of the character display region 612 occurs in the step 812, the character display unit 728 recognizes a non-display upper matching character matched as the upper pair with the character of the corresponding keyboard button as an input and displays the non-display upper matching character in a predetermined position of the character output region 614 (step 816).

For example, referring to FIG. 6A, when the 'ㄴ' character button of the character display region 612 is touched in the Korean input mode and dragged off to the character output region 614 in the upper outer side of the character display region 612, a 'ㅈ' character that is an upper matching character matched as an upper pair with the 'ㄴ' character is recognized as an input and displayed in the predetermined position of the character output region 614.

When the drag off to the lower outer side of the character display region 612 occurs in the step 814, the character display unit 728 recognizes a non-display lower matching character matched as a lower pair with the character of the corresponding keyboard button as an input and displays the non-display lower matching character in the predetermined position of the character output region 614 (step 818).

For example, referring to FIG. 6A, when the 'ㅣ' character button in the character display region 612 is touched in the Korean input mode and dragged off to the lower outer side of the character display region 612, a 'ㅕ' character that is a lower matching character matched as a lower pair with the 'ㄴ' character is recognized as an input and displayed in a predetermined position of the character output region 614.

Figure 9:
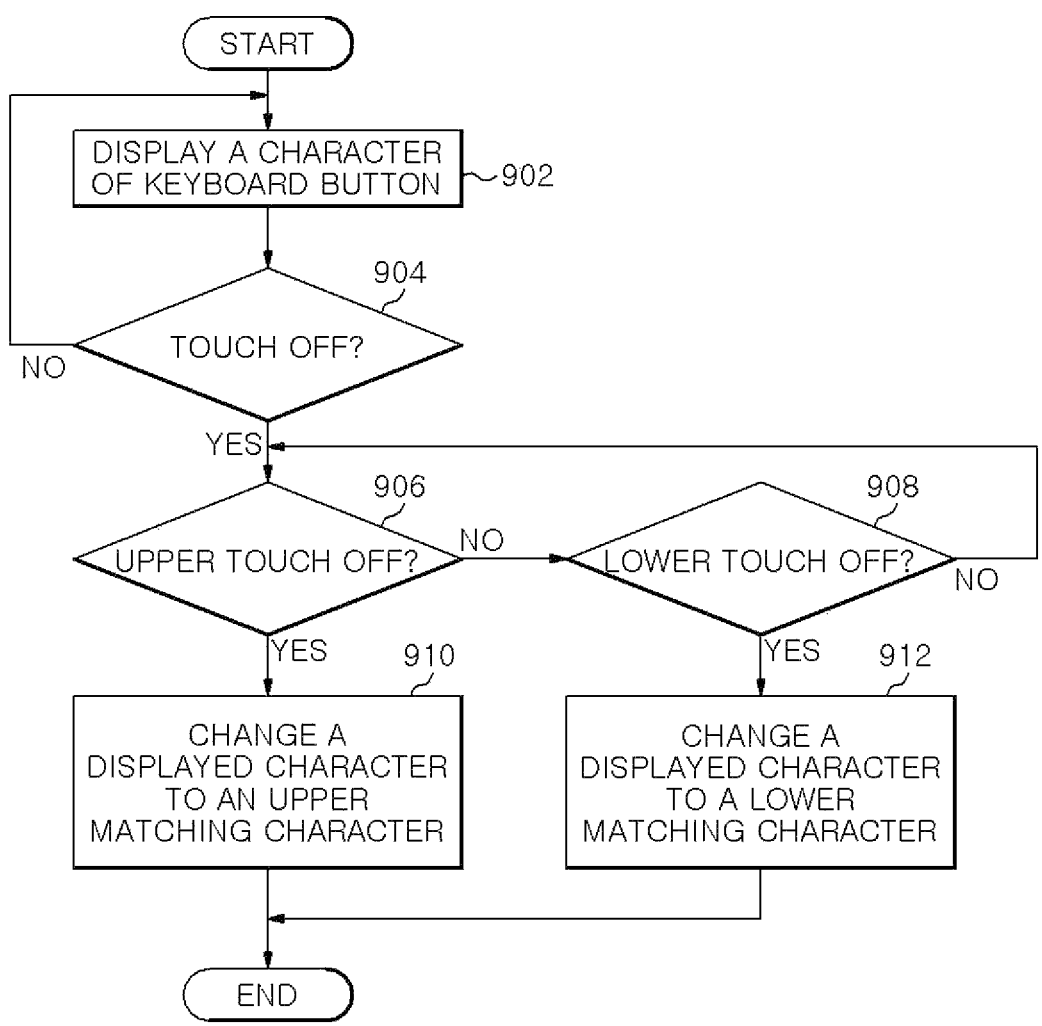
FIG. 9 is a flowchart showing main process of changing a previously inputted character of the keyboard button to an upper or a lower matching character in the second embodiment.

FIG. 9 is a flowchart showing main processes of changing a pre-inputted character on a keyboard button to an upper matching character or a lower matching character in the second embodiment.

Referring to FIG. 9, when the touch off of any keyboard button (character button) in the character display region 612 occurs and the character of the corresponding keyboard button is displayed on the character output region 614 (step 902), the character display unit 728 checks (monitors) whether or not the touch off occurs within a predetermined time (step 904).

If the touch off occurs in the step 904, the character display unit 728 checks whether the corresponding touch off occurs in the character output region 614 in the upper outer side of the character display region 612 (upper touch off) (step 906) or in the lower outer side of the character display region 612 (lower touch off) (step 908).

If it is determined in the step 906 that the touch off occurs in the character output region 614 in the upper outer side of the character display region 612 (upper touch off), the character display unit 728 changes the corresponding character displayed on the character output region 614 to an upper matching character adjacent thereto in the left upper direction in the arraignment structure of the qwerty keyboard and displays the upper matching character (step 910).

For example, referring to FIG. 6A, when the touch off occurs in the character output region 614 in the upper outer side of the character display region 612 occurs within a predetermined time in a state where the 'ㄴ' character is recognized as an input in the Korean input mode and displayed in a predetermined position of the character output region 614, the character display unit 728 changes the 'ㄴ' character to the 'ㅈ' character that is the upper matching character adjacent thereto in the left upper direction in the arrangement structure of the qwerty keyboard and displays the 'ㅈ' character.

If it is determined in the step 908 that the touch off occurs in the lower outer side of the character display region 612 (lower touch off), the character display unit 728 changes the corresponding character displayed on the character output region 614 to the lower matching character adjacent thereto in the right lower direction of the arrangement structure of the qwerty keyboard and displays the lower matching character (step 912).

For example, referring to FIG. 6A, when the touch off occurs in the lower outer side of the character display region 612 within a predetermined time in a state where the 'ㅣ' character is recognized as an input in the Korean input mode and displayed in the predetermined position of the character output region 614, the character display unit 728 changes the 'ㄴ' character to the 'ㅕ' character that is the lower matching character adjacent thereto in the right lower direction in the arrangement structure of the qwerty keyboard and displays the 'ㅕ' character.

Third Embodiment

FIGS. 10A to 10D show examples of a screen for performing a character recognition method according to a third embodiment.

Figure 10A:
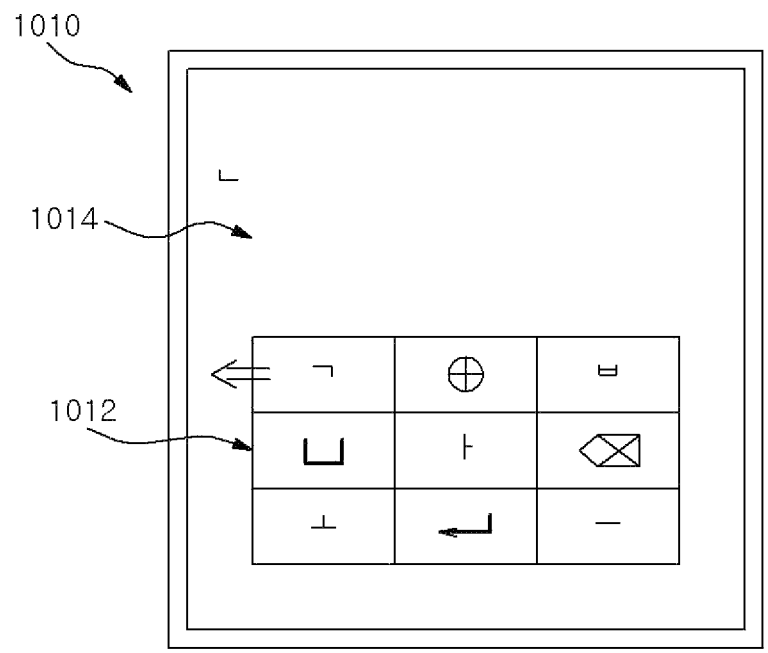
FIGS. 10A to 10D show examples of a screen where a character recognition method according to a third embodiment of the present disclosure is performed.

Referring to FIG. 10A, a character input screen 1010 displayed on a touch panel (touch-type small-sized display panel) attached (installed) to a small-sized terminal (e.g., a small-sized wearable device such as a smart watch or the like) may include, e.g., a character display region 1012, a character output region 1014, or the like.

The character display region 1012 in the character input screen 1010 for Korean input is provided with character buttons including representative consonant buttons (e.g., 'ㄱ' button, 'ㅂ' button and the like) and representative vowel buttons (e.g., 'ㅏ' button, 'ㅓ' button, 'ㅡ' button and the like), a plurality of function key buttons and the like. For example, in a touch panel having a square structure, the buttons may be arranged (formed) at predetermined positions of the lower end portion of the screen.

Each of the character buttons in the character display region 1012 may be defined as a touch button or a touch key. Each of the character buttons may be assigned with a single character (button display character) and a single matching character matched therewith in each of a left direction, an upward direction, a right direction and a downward direction.

For example, a 'ㄱ' button may be assigned with matching characters (non-display matching characters) in the respective directions, i.e., a 'ㄴ' character in the left direction, a 'ㄷ' character in the upward direction, a 'ㄹ' character in the right direction and a 'ㅁ' character in the downward direction. A 'ㅂ' button may be assigned with matching characters (non-display matching characters) in the respective directions, i.e., a 'ㅅ' character in the left direction, a 'ㅇ' character in the upward direction, a 'ㅈ' character in the right direction and a 'ㅎ' character in the downward direction.

In other words, each of the representative consonant buttons may be sequentially assigned with the matching characters adjacent thereto in the dictionary order in four directions starting from the left along the clockwise direction.

Therefore, in the arrangement structure in which the matching characters are matched in the respective directions along the clockwise direction as described above, a 'ㄱ' character can be inputted (recognized as an input and displayed) by touching off a 'ㄱ' button. A 'ㄴ' character can be inputted by touching the 'ㄱ' button and dragging it off to the left. A 'ㄷ' character can be inputted by touching the 'ㄱ' button and dragging it off upward. A 'ㄹ' character can be inputted by touching the 'ㄱ' button and dragging it off to the right. A 'ㅁ' character can be inputted by touching the 'ㄱ' button and dragging it off downward.

The hard consonants and the aspirated consonants of the Korean consonant can be inputted by the same interface as that in the first embodiment. For example, the inputted 'ㄱ' character can be converted to a 'ㅋ' character by touching off the (+) button ('ㅋ' character input). Further, the inputted 'ㄱ' character can be converted to a 'ㄲ' character by dragging off the (+) button to the character output region 1014 ('ㄲ' character input).

Figure 10B:
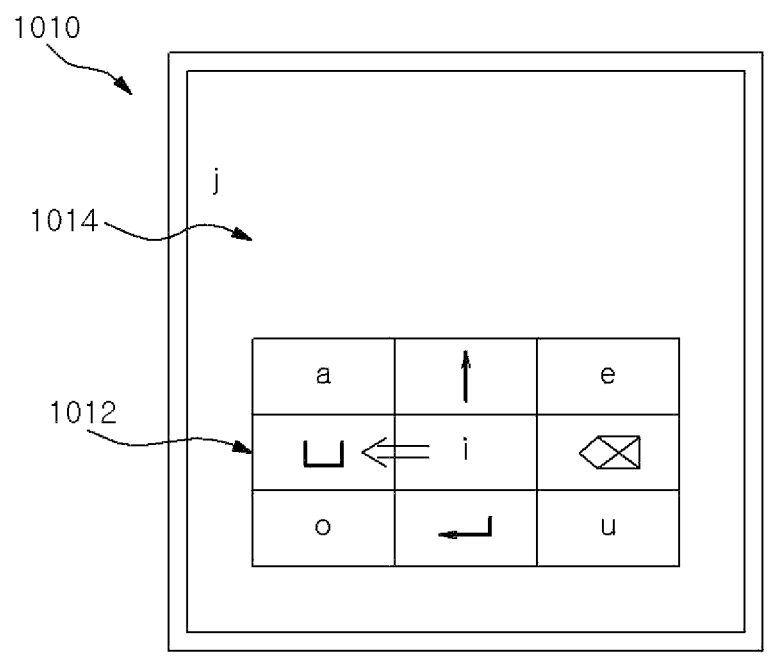
Figure 10C:
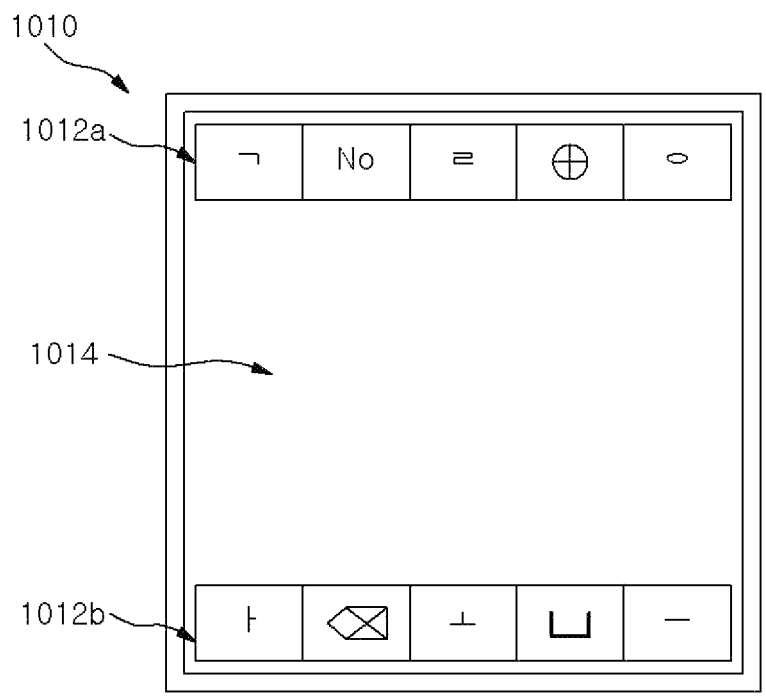

In the present embodiment, the Korean vowels can be inputted by using the representative vowel consonants by the same interface as that in the first embodiment In the character input screen for inputting Korean in the present embodiment, as shown in FIG. 10C, the character display region is divided (partitioned) into a first input region 1012a including the representative consonant buttons and the like and a second input region 1012b including the representative vowel buttons and the like. The first input region 1012a can be disposed at a predetermined position of the upper end portion of the character input screen 1010 and the second input region 1012b can be disposed at a predetermined position of the lower end portion of the character input screen 1010.

Referring to FIG. 10C, unlike the example shown in FIG. 10A, the representative consonant characters may include three characters (e.g., ㄱ, ㄹ and ㅇ). In this arrangement structure, the 'ㄱ' button may be assigned with a 'ㄴ' character as a matching character in the right direction and a 'ㄷ' character as a matching character in in the downward direction.

A 'ㄹ' button may be assigned with the matching characters, i.e., a 'ㅁ' character in the left direction, a 'ㅂ' character in the right direction, and a 'ㅅ' character in the downward direction. A 'ㅇ' button may be assigned with the matching characters, i.e., a 'ㅈ' character in the left direction and a 'ㅎ' character in the downward direction.

In that case, the left/right side and the upper side of the representative consonant character display region and the left/right side and the lower side of the representative vowel character display region are not assigned with the matching characters. Therefore, the space of character input is not required and the character output region positioned in the middle of the screen is used as the common input region. Accordingly, the space can be more effectively used.

Although the arrangement structure and the positions of the character buttons in FIG. 10C are different from those in FIG. 10A, the Korean consonants can be inputted by the substantially same interface (button touch and drag off in the respective directions).

In the button arrangement structure of FIG. 10C, hard consonants, aspirated consonants, vowels of Korean can be inputted by the same interface as that in the arrangement structure shown in FIG. 10A.

Referring to FIG. 10B, the character input screen 1010 for alphabet input may include the character display region 1012, the character output region 1014 and the like as in the case shown in FIG. 10A. The representative character buttons may include, e.g., alphabet vowel character buttons and the like.

Each of the representative character buttons in the character display region 1012 may be defined as a touch button or a touch key. Each of the representative character buttons may be assigned with a single character (button display character) and a single matching character in each of the left direction, the upward direction, the right direction, the downward direction and the forward direction. The forward direction may indicate the case in which the corresponding character button is pressed for a predetermined time (e.g. 1.5 seconds, 2 seconds or the like).

Therefore, an 'a' button may be assigned with the matching characters (non-display matching characters) in the respective directions, i.e., a 'b' character in the left direction, a 'c' character in the upward direction, and a 'd' character in the right direction. An 'e' button may be assigned with the matching characters (non-display matching character) in the respective directions, i.e., a 'f' character in the left direction, a 'g' character in the upward direction, and a 'h' character in the right direction.

An 'i' button may be assigned with the matching characters (non-display matching character) in the respective directions, i.e., a 'j' character in the left direction, a 'k' character in the upward direction, a 'l' character in the right direction, a 'm' character in the downward direction, and a 'n' character in the forward direction. An 'o' button may be assigned with the matching characters (non-display matching characters) in the respective directions, i.e., a 'p' character in the left direction, a 'q' character in the upward direction, a 'r' character in the right direction, a 's' character in the downward direction and a 't' character in the forward direction. A 'u' button may be assigned with the matching characters (non-display matching characters), i.e., a 'v' character in the left direction, a 'w' character in the upward direction, a 'x' character in the right direction, a 'y' character in the downward direction, and a 'z' character in the forward direction.

In other words, each of the representative alphabet vowel buttons may be sequentially assigned with matching characters adjacent thereto in the alphabetical order in the four directions starting from the left along the clockwise direction and in the forward direction.

Therefore, in the arrangement structure in which the matching characters are matched in the clockwise direction and in the forward direction as described above, an 'i' character can be inputted by touching off an 'i' button (input recognition and display); a 'j' character can be inputted by touching the 'i' button and dragging it off to the left; a 'k' character can be inputted by touching the 'i' button and dragging it off upward; a 'l' character can be inputted by touching the 'i' button and dragging it off to the right; a 'm' character can be inputted by touching the 'i' button and dragging it off downward; and an 'n' character can be inputted by pressing the 'i' button for a predetermined time.

A '↑' button between the 'a' button and the 'e' button in the character display region 1012 in FIG. 10B can be utilized as an alphabet capital lock key.

Figure 10D:
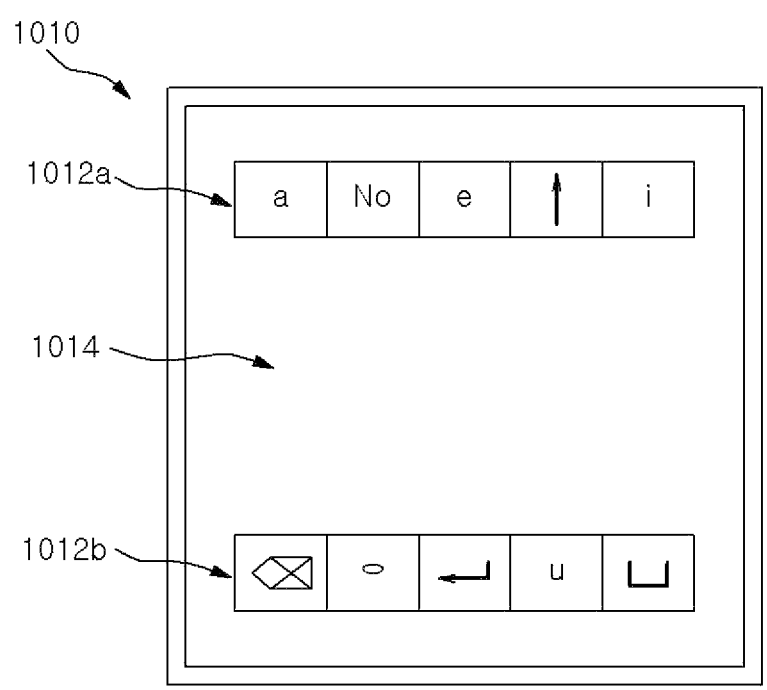

In the character input screen for alphabet input in the present embodiment, as shown in FIG. 10D, the character display region is partitioned (divided) into the first input region 1012a and the second input region 1012b. The first input region 1012a can be disposed at a predetermined position of the upper end portion of the character input screen 1010. The second input region 1012b can be disposed at a predetermined position of the lower end portion of the character input screen 1010.

Although the arrangement structure and the positions of the character buttons (representative vowel buttons) in FIG. 10D are different from those in FIG. 10B, alphabet can be inputted by the substantially same interface (button touch, drag off to the respective directions, and pressing button for a while).

When touch off is detected in the display output region within a predetermined time (e.g., 1 second, 1.5 seconds, 2 seconds or the like) in a state where a character (or matching character) recognized as an input character by touch off or drag off is displayed on the display output region 1014, the character (e.g., 'ㄷ' in Korean or 'l' in alphabet) currently displayed on the display output region 1014 can be changed to and displayed as a next character (e.g., 'ㄹ' or 'm') in the dictionary order. Whenever the touch off is detected in the character output region within the predetermined time, the character (e.g., 'ㄹ' or 'm') currently displayed on the character output region 1014 can be sequentially changed to and displayed as next characters (e.g., 'ㅁ', 'ㅂ', 'n', 'o' and the like) in the dictionary order.

When the touch in the character output region 1014 is maintained for a predetermined time (e.g., 1.5 seconds, 2 seconds, 2.5 seconds, 3 seconds or the like) in a state where a character (or matching character) recognized as an input character by touch off or drag off is displayed on the character output region 1014 and then the touch off is detected, the character (e.g., 'ㄹ' in Korean or 'm' in alphabet) currently displayed on the character output region 1014 can be changed to and displayed as a previous character (e.g., 'ㄷ' or 'l') in the dictionary order.

Whenever the touch off is detected in the character output region within a predetermined time, the character (e.g., 'ㄷ' or 'l') currently displayed on the character output region 1014 can be sequentially changed to and displayed as previous characters (e.g., 'ㄴ', 'ㄱ', 'k', 'j' and the like) in the dictionary order.

In FIGS. 10B and 10D, when the '↑' button is touched and dragged off to the character output region (common use region), it is converted to and displayed as the caps lock key. In FIGS. 10A to 10D, when the back space key is dragged off to the common use region, it is changed to and displayed as a non-display '←' key matched therewith. When the space key is dragged off to the common use region, it is changed to and displayed as a non-display '→' key matched therewith. When the enter key is dragged off to the common use region, it is changed to and displayed as a non-display delete key matched therewith.

Figure 11:
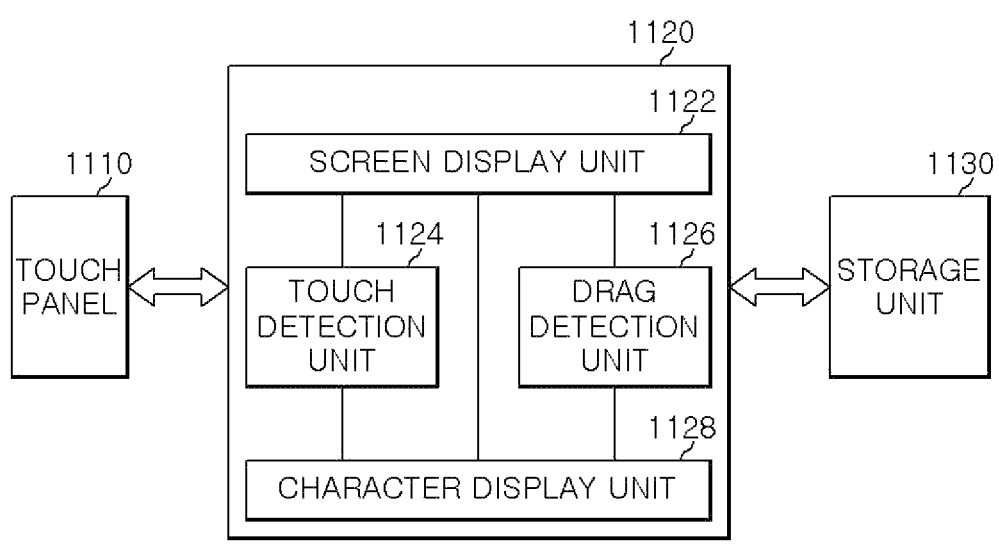
FIG. 11 is a block diagram of a character recognition apparatus according to the third embodiment.

FIG. 11 is a block diagram of the character recognition apparatus according to the third embodiment. The character recognition apparatus may include a touch panel 1110, a single processing block 1120, a storage unit 1130 and the like. The signal processing block 1120 may include a screen display unit 1122, a touch detection unit 1124, a drag detection unit 1126, a character display unit 1128 and the like. A part or all of the components of the single processing block 1120 can be collectively realized by a microprocessor and can also be realized in the form of an application.

Referring to FIG. 11, the touch panel 1110 corresponds to the touch panel 210 shown in FIG. 2; the screen display unit 1122 corresponds to the screen display unit 222 shown in FIG. 2; the touch detection unit 1124 corresponds to the touch detection unit 224 shown in FIG. 2; the drag detection unit 1126 correspond to the drag detection unit 226 shown in FIG. 2; and the storage unit 1130 correspond to the storage unit 230 shown in FIG. 2. The component corresponding to each other denote the same components having substantially the same functions. Therefore, detailed description thereof will be omitted for simple description.

The drag detection unit 1126 can detect drag and drag off of the character buttons in the character display region 1012 in four directions starting from the left along the clockwise direction and provide the detection result to the character display unit 1128.

When the touch off signal of a certain character button is transmitted from the touch detection unit 1124, the character display unit 1128 can recognize the character displayed on the corresponding character button as an input and display the character in the predetermined position of the character output region 1014. When a directional drag off signal (one of a leftward drag off signal, an upward drag off signal, a rightward drag off signal and a downward drag off signal) is transmitted from the drag detection unit 1126, the character display unit 1128 can recognize the matching character matched in the dragged direction as an input and display the matching character in the predetermined position of the character output region 1014.

When the touch off signal is transmitted from the touch detection unit 1124 after the touch is maintained for a predetermined time, the character display unit 1128 can recognize a matching character matched in the forward direction with the corresponding character button (e.g., an 'n' character matched in the forward direction with the 'i' button in the alphabet input screen) as an input and display the matching character in a predetermined position of the character output region 1014.

When the function key button is touched and dragged off to one of the directions, the character display unit 1128 can recognize a non-display matching function key matched with the function key button as an input and display the non-display matching function key.

The following is detailed description of a series of process of selectively inputting matching characters in multiple directions by drag off in the respective directions by using the character recognition apparatus of the present embodiment which is configured as described above.

Figure 12:
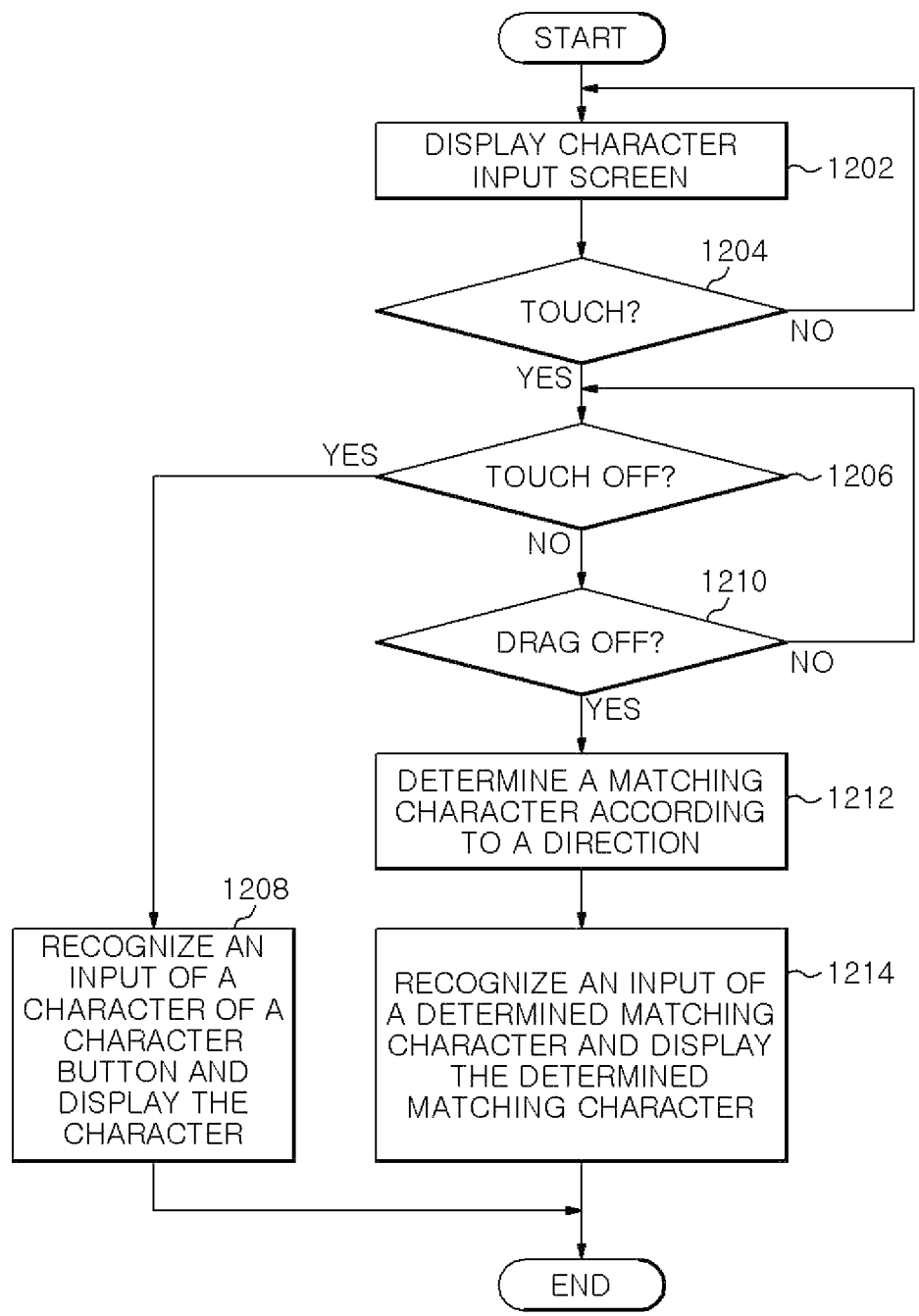
FIG. 12 is a flowchart showing main processes of recognizing an input character by drag off to matching characters in multiple directions in the third embodiment.

FIG. 12 is a flowchart showing main processes of recognizing an input character by drag off in multiple directions in the third embodiment.

Referring to FIG. 12, when the user interface for character input, e.g., touch of a character icon displayed on a predetermined position of the touch panel or the like, is detected by the touch detection unit 1124, the display unit 1122 displays on the touch panel the character input screen 1010 including the character display region 1012 and the character output region 1014 as the common use region as shown in FIG. 10A (step 1202).

The character display region 1012 in the character input screen may be provided with a plurality of character buttons including representative consonant buttons (e.g., a 'ㄱ' button, a 'ㅂ' button and the like), representative vowel buttons (e.g., a 'ㅏ' button, a 'ㅗ' button, a 'ㅡ' button and the like), a plurality of function keys, and the like.

The touch detection unit 1124 detects touch of any one of the character buttons (the representative consonant buttons or the representative vowel buttons) in the character display region 1012 (step 1204). For example, when the touch of the character button is detected, it is checked (monitored) whether or not the touch off of the corresponding character button occurs (step 1206).

When the touch off of the corresponding character button is detected in the step 1206, the character display unit 1128 recognizes the character (button display character) displayed on the corresponding character button as an input and displays the character in a predetermined position of the character output region 1014 (step 1208).

For example, when a 'ㄱ' character is touched off in the Korean input screen shown in FIG. 10A, the character display unit 1128 displays the 'ㄱ' character in the character output region 614. For example, when an 'i' character is touched off in the alphabet input screen shown in FIG. 10B, the character display unit 1128 displays the 'i' character in the character output region 1014.

When the touch off of the character button does not occur, the drag detection unit checks (monitors) whether the touch is dragged off in any one of the four directions (or the four directions and the forward direction of the corresponding button) (directional drag off) (step 1210). The forward direction of the corresponding button may indicate the case in which the corresponding character button is pressed for a predetermined time.

When the drag off occurs in the step 1210, the character display unit 1128 determines the direction (e.g., left, up, right, down or the like) of the drag off and determines a non-display matching character matched in the determined direction as an input (step 1212).

Then, the character display unit 1128 recognizes the determined matching character as an input and displays the determined matching character in a predetermined position of the character output region 1014 (step 1214).

For example, when the touched character button is the 'ㄱ' button in the Korean input screen shown in FIG. 10A and the drag off in the left direction occurs, the character display unit 1128 determines the 'ㄴ' character matched in the left direction with the 'ㄱ' button as the matching character. The 'ㄴ' character is recognized as an input and displayed in a predetermined position of the character output region 1014.

For example, when the touched character button is the 'i' button in the alphabet input screen shown in FIG. 10B and the drag off in the left direction occurs, the character display unit 1128 determines the 'j' character matched in the left direction with the 'i' button as the matching character. The 'j' character is recognized as an input and displayed in a predetermined position of the character output region 1014.

The character recognition apparatus for Korean and alphabet has been described in the embodiments of the present embodiment. However, the present invention is not limited thereto and may also be applied to various languages, e.g., Japanese, Chinese, German, French, Spanish, Russian and the like.

Combinations of blocks in the flowcharts of the present invention can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the steps of the flowchart.

These computer program instructions may also be stored in a computer usable or computer readable memory that can direct a computer or other programmable data processing apparatuses to function in a particular manner, such that the instructions stored in the computer usable or computer readable medium can produce an article of manufacture including instructions which implement the function specified in the blocks of the flowcharts.

The computer program instructions may also be loaded onto a computer or other programmable data processing apparatuses to cause a series of operational steps to be performed on the computer or other programmable apparatuses to produce a computer implemented process such that the instructions which execute on the computer or other programmable apparatuses provide processes for implementing the functions specified in the blocks of the flowcharts.

Each block in the flowchart may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The above description is merely exemplary description of the technical scope of the present invention, and it will be understood by those skilled in the art that various changes and modifications can be made without departing from original characteristics of the present invention. Therefore, the embodiments disclosed in the present invention are intended to explain, not to limit, the technical scope of the present invention, and the technical scope of the present invention is not limited by the embodiments.

Therefore, the protection scope of the present invention should be interpreted based on the following claims and it should be appreciated that all technical scopes included within a range equivalent thereto are included in the protection scope of the present invention.

While the disclosure has been shown and described with respect to the embodiments, it will be understood by those skilled in the art that various changes and modifications may be made without departing from the scope of the disclosure as defined in the following claims.

What is claimed is:

1. A character recognition apparatus comprising:
   a screen including a character display region including a plurality of character buttons and one or more function key buttons, each being matched with a non-display matching function key, and a character output region for displaying characters inputted by using the respective character buttons; and
   a character recognition block for recognizing, when a displayed character button among the character buttons is touched and dragged off to the character output region, a non-display character matched with the displayed character button as an input and displaying the non-display character in the character output region,
   wherein the non-display character is different from the displayed character,
   wherein the character output region has a character input function and the character input function is triggered when a touch or drag condition is detected within the character output region under a predetermined condition,
   wherein the predetermined condition includes a situation in which the character output region is touched off within a predetermined time after the display of the character or the matching character,
   wherein the character input function includes that the character recognition block sequentially changes a character currently displayed on the character output region to a next character in a dictionary order in response to additional touches which are detected on the character output region within the predetermined time since the character is displayed on the character output region,
   wherein the next character is changed to an another next character following the next character in the dictionary order only when a following touch of a directly previous touch is detected on the character output region within the predetermined time since the directly previous touch is detected on the character output region, the directly previous touch having changed the character to the next character, and
   wherein the next character maintains to be displayed on the character output region when the following touch is detected on the character output region over the predetermined time since the directly previous touch is detected.

2. The character recognition apparatus of claim 1, wherein the predetermined condition includes a situation in which the touch on the character output region is maintained for a predetermined time and then released within a predetermined time since the character output region is touched after the display of the display character or the non-display character, and
   wherein the character input function includes that the character recognition block changes a character currently displayed on the character output region to a previous character in a dictionary order and then sequentially to previous characters in the dictionary order in response to a number of touch on the character output region.

3. The character recognition apparatus of claim 1, wherein the character recognition block includes:
   a touch detection unit for detecting touch or touch off of the character button and a function key button;
   a drag detection unit for detecting drag or drag off to the character output region; and
   a character display unit for recognizing, when the touch off is detected, the character as an input and displaying the character in the character output region and for recognizing, when the drag off is detected, the matching character as an input and displaying the matching character in the character output region.

4. A character recognition apparatus comprising:
   a screen including a character display region having keyboard buttons in the middle row of a qwerty keyboard and a character output region for displaying characters inputted by using the keyboard buttons, the character output region having a first region positioned in an upper outer side of the character display region and a second region positioned in a lower outer side of the character display region; and
   a character recognition block for recognizing, when a keyboard button touched and is dragged off to the first region, a non-display upper matching character matched as an upper pair with a character of the keyboard button as an input and displaying the non-display upper matching character in the first region and for recognizing, when the touch of the keyboard button is dragged off to the second region, a non-display lower matching character matched as a lower pair with the character as an input and displaying the non-display lower matching character in the first region,
   wherein the non-display upper matching character and the non-display lower matching character are different from the displayed character,
   wherein the character output region has a character input function and the character input function is triggered when a touch or drag condition is detected within the character output region under a predetermined condition;
   wherein the predetermined condition includes a situation within which the first region is touched off within a predetermined time after display of the character or the upper matching character, and
   wherein the character input function includes that the character recognition block changes a character displayed on the first region to the upper non-display character and then sequentially to a character adjacent thereto in an upper right direction in the arrangement of the qwerty keyboard and then display a matching character matched therewith in response to a number of touches which are detected on the first region within the predetermined time since the character is displayed on the first region, and
   when the touch is maintained for a predetermined time and then released, the character recognition block changes the character displayed on the first region to a character matched as an upper pair with a previous character of the character and then sequentially to a character matched as the upper pair therewith and a character adjacent thereto in an upper left direction in the arrangement of the qwerty keyboard in response to the number of touch which is detected on the first region within the predetermined time since the next character is displayed on the first region.

5. The character recognition apparatus of claim 4, wherein the character display region further includes one or more function key buttons, each being matched with a non-display matching function key, and the character recognition block recognizes, when touch of a function key button is dragged off to the character output region, a non-display matching function key matched with the function key button as an input.

6. The character recognition apparatus of claim 4, wherein the keyboard buttons in the middle row of the qwerty keyboard are divided into left hand input buttons and right hand input buttons arranged in two layers in a lower end portion of the character input screen including the character output region.

7. The character recognition apparatus of claim 4, wherein the character display region is divided into a left hand input keyboard region and a right hand input keyboard region, wherein the left hand input keyboard region is disposed at a predetermined position of an upper end portion of the character input screen including the character output region, and the right hand input keyboard region is disposed at a predetermined position of a lower end portion of the character input screen.

8. The character recognition apparatus of claim 4, wherein the predetermined condition includes a situation in which the second region is touched within a predetermined time after the display of the character or the lower matching character, and wherein the character input function includes that the character recognition block changes the character displayed on the first region to the lower matching character and then sequentially to a character adjacent thereto in a lower right direction of the keyboard and a matching character matched therewith in response to the number of touch on the second region, and when the touch is maintained for a predetermined time and then released, the character recognition block changes the character displayed on the first region to a character matched as the lower pair with a previous character of the character and then sequentially to a character matched as the lower pair therewith and a character adjacent thereto in a lower left direction of the keyboard and a matching character thereof in response to the number of touch on the second region.

9. The character recognition apparatus of claim 4, wherein the character recognition block includes:

a touch detection unit for detecting touch or touch off of a keyboard button;

a drag detection unit for detecting drag or drag off to the character output region in an upper outer side of the character display region or to a lower outer side of the character display region; and a character display unit for recognizing, when the touch off is detected, a character displayed on a corresponding keyboard button as an input and displaying the character in the character output region and for recognizing, when the drag off is detected, the upper matching character or the lower matching character as an input and displaying the upper matching character or the lower matching character in the character output region.

10. A character recognition apparatus comprising:

a screen including a character display region having a plurality of character buttons each being matched with non-display matching characters in respective preset multiple directions, and one or more function key buttons, each being matched with a non-display matching function key, and a character output region for displaying characters inputted by using the character buttons, a character recognition block for recognizing, when a displayed character button among the character buttons is touched and dragged off to one of the directions, a matching character matched in said one of the directions as an input and displaying the matching character in the character output region;

wherein the displayed character is different from the matched non-display characters, wherein the character output region has a character input function and the character input function is triggered when a touch or drag condition is detected within the character output region under a predetermined condition, wherein the predetermined condition includes a situation in which the character output region is touched off within a predetermined time after the display of the character or the matching character, wherein the character input function includes that the character recognition block sequentially changes a character currently displayed on the character output region to a next character in a dictionary order in response to additional touches which are detected on the character output region within the predetermined time since the character is displayed on the character output region, wherein the next character is changed to an another next character following the next character in the dictionary order only when a following touch of a directly previous touch is detected on the character output region within the predetermined time since the directly previous touch is detected on the character output region, the directly previous touch having changed the character to the next character, and wherein the next character maintains to be displayed on the character output region when the following touch is detected on the character output region over the predetermined time since the directly previous touch is detected.

11. The character recognition apparatus of claim 10, wherein the character recognition block recognizes, when the touch of the character button is maintained for a predetermined time and then released, a matching character matched in a forward direction with the character of the character button as an input and displays the matching character in the character output region.

12. The character recognition apparatus of claim 10, wherein the matching characters are characters next to the character in a dictionary order.

13. The character recognition apparatus of claim 10, wherein the character display region is divided into a first input region and a second input region, wherein the first input region is disposed at a predetermined position in an upper end portion of the character input screen including the character output region, and wherein the second input region is disposed at a predetermined position in a lower end portion of the character input screen.

14. The character recognition apparatus of claim 10, wherein the predetermined condition includes a situation in which the touch on the character output region is maintained for a predetermined time and then released within a predetermined time since the character output region is touched after the display of the character or the matching character, and wherein the character input function includes that the character recognition block changes the character currently displayed on the character output region to a previous character in a dictionary order and then sequentially to previous characters in the dictionary order in response to the number of touch on the character output region.

15. The character recognition apparatus of claim 10, wherein the character recognition block includes:

a touch detection unit for detecting touch or touch off of the character;

a drag detection unit for detecting drag or drag off in one of the directions; and a character display unit for recognizing, when the touch off is detected, a character displayed on the character button as an input and displaying the character in the character output region and for recognizing, when the drag off is detected, a matching character matched in a dragged direction as an input and displaying the matching character in the character output region.

* * * * *